US006619267B1

United States Patent
Pao

(10) Patent No.: US 6,619,267 B1
(45) Date of Patent: Sep. 16, 2003

(54) METHOD AND SYSTEM FOR PROVIDING SMOOTH MODE TRANSITIONS IN A VARIABLE DISPLACEMENT INTERNAL COMBUSTION ENGINE

(75) Inventor: Hsien Chung Pao, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/294,535

(22) Filed: Nov. 14, 2002

(51) Int. Cl.[7] .................................................. F02D 7/00
(52) U.S. Cl. ............... 123/481; 123/198 F; 123/184.25
(58) Field of Search .................................. 123/481, 478, 123/198 D, 184.24, 184.25, 184.21, 184.48, 184.59

(56) References Cited

U.S. PATENT DOCUMENTS

| | | | |
|---|---|---|---|
| 5,267,541 A | 12/1993 | Taguchi et al. | 123/198 |
| 5,481,461 A | 1/1996 | Miyamoto et al. | 364/431.01 |
| 5,490,486 A | 2/1996 | Diggs | 123/198 |
| 5,732,680 A | * 3/1998 | Ninomiya et al. | 123/481 |
| 5,970,943 A | 10/1999 | Robichaux et al. | 123/198 |
| 6,360,713 B1 | 3/2002 | Kolmanovsky et al. | 123/195 |

* cited by examiner

Primary Examiner—Bibhu Mohanty
(74) Attorney, Agent, or Firm—Julia Voutyras; Allan J. Lippa

(57) ABSTRACT

An engine having a plurality of cylinder banks, each one of the banks having at least one cylinder. Each one of the banks is fed air through a corresponding one of a pair of manifold plenums. A main throttle body is provided having an outlet for feeding air to a pair of output ports, each one of such output ports being coupled to feed the air to a corresponding one of the pair of manifold plenums. The main throttle body has a main throttle plate disposed therein to control airflow passing to the outlet of the main throttle body. One of the pair of plenums has a plenum throttle plate for controlling air from the one of the pair of output ports of the main throttle body coupled thereto to cylinders in the bank of cylinders coupled thereto. During transitions from an engine operation mode using a first number of the cylinders to a mode using a different number of the cylinders, the plenum throttle plate is operated to provide a change in airflow to said one of the pair of plenums in a first sense thereby changing the airflow in the other one of the bank of cylinders in a second, opposite sense.

4 Claims, 14 Drawing Sheets

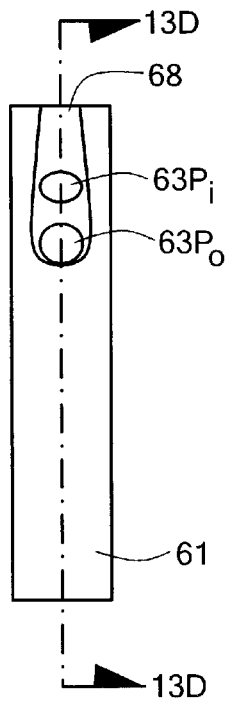
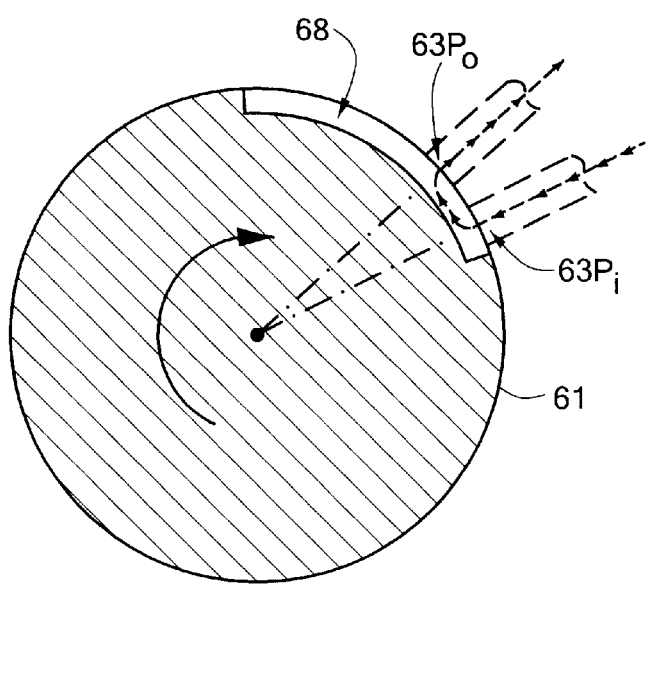
*FIG. 13C*  *FIG. 13D*
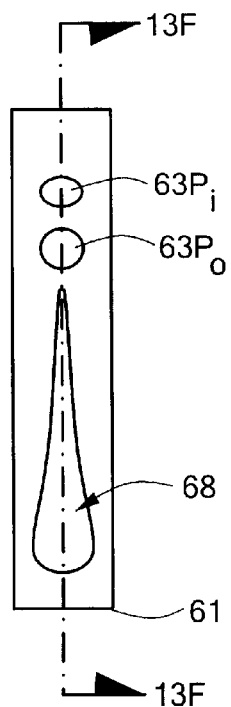
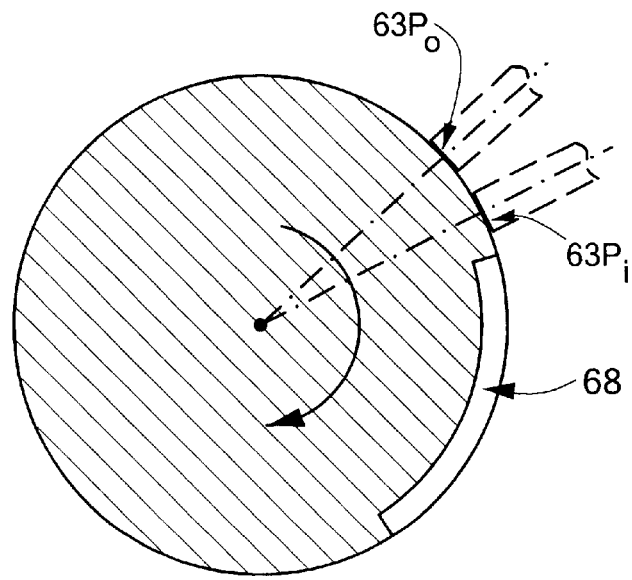
*FIG. 13E*  *FIG. 13F*

METHOD AND SYSTEM FOR PROVIDING SMOOTH MODE TRANSITIONS IN A VARIABLE DISPLACEMENT INTERNAL COMBUSTION ENGINE

TECHNICAL FIELD

This invention relates to internal combustion engines, and more particularly to variable displacement internal combustion engines.

BACKGROUND AND SUMMARY OF THE INVENTION

As is known in the art, in order to reduce fuel consumption in a multi-cylinder internal combustion engine, it has been suggested to operate such engine during periods of low torque demand with only a portion of the cylinders. Such engines are sometimes referred to as variable displacement engines (VDEs). Thus, when the operator is not demanding engine torque, less than all cylinders are operational; however, when the operator demands a large amount of torque all cylinders are made operational. One problem with such system is that the transition between all cylinder operation and less than all cylinder operation may cause an unpleasant abruptness in the operation of the engine.

In accordance with the present invention, an engine is provided having a plurality of cylinder banks, each one of the banks having at least one cylinder. Each one of the banks is fed air through a corresponding one of a pair of manifold plenums. A main throttle body is provided having an outlet for feeding air to a pair of output ports, each one of such output ports being coupled to feed the air to a corresponding one of the pair of manifold plenums. The main throttle body has a main throttle plate disposed therein to control airflow passing to the outlet of the main throttle body. One of the pair of plenums has a plenum throttle plate for controlling air from the one of the pair of output ports of the main throttle body coupled thereto to cylinders in the bank of cylinders coupled thereto.

With such an arrangement, during transitions from an engine operation mode using a first number of the cylinders to a mode using a different number of the cylinders, the plenum throttle plate is operated to provide a change in airflow to said one of the pair of plenums in a first sense thereby changing the airflow in the other one of the bank of cylinders in a second, opposite sense.

Because, for any main throttle plate position, the mass airflow to the outlet of the main throttle body changes during the transition between engine operating modes as a result of different vacuum effects being produced by operating the engine with a different number of cylinders, airflow compensation is provided to maintain the airflow to the outlet of the main throttle body constant during the mode transition if the main throttle plate is held unchanged by an operator. In one embodiment, the airflow compensation includes providing a compensation control signal to the main throttle plate, as when an electronic throttle is used. In another embodiment, an airflow by-pass structure is coupled to the main throttle body upstream of the main throttle to adjust airflow downstream of the main throttle as the number of operating cylinders in the engine changes. With either embodiment, during the mode change, a substantially continuous total mass airflow is maintained to the operational cylinders and therefore a continuous and smooth change in engine torque output is achieved. Thus, the method produces a torque output which is similar to the torque output, which would be produced with a non-variable displacement engine (VDE).

In one embodiment, immediately before disabling or enabling cylinders in the one of the banks, the inlet airflow to such bank is kept to a minimum for minimum torque output while preventing such disabled or enabled cylinders from misfiring.

With such method, smooth engine torque changes are accomplished as the number of operating cylinder changes while the method maintains exhaust emissions requirements and good fuel economy.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 13C is a side view sketch of the exemplary one of a pair of spool valves shown in FIG. 13B, such valve being shown in an open position in FIG. 13C;

FIG. 13D is a cross-sectional sketch of the exemplary one of a pair of spool valves shown in FIG. 13B, such valve being shown in an open position in FIG. 13D, such cross-section being taken along line 13D—13D in FIG. 13C;

FIG. 13E is a side view sketch of the exemplary one of a pair of spool valves shown in FIG. 13B, such valve being shown in an closed position in FIG. 13E; and FIG. 13F is a cross-sectional sketch of the exemplary one of a pair of spool valves shown in FIG. 13B, such valve being shown in an open position in FIG. 13F, such cross-section being taken along line 13F—13F in FIG. 13E.

Like reference symbols in the various drawings indicate like elements.

DETAILED DESCRIPTION

It should be understood that while the embodiment described herein is for a V-8 engine, the invention is applicable to any V-type internal combustion engine.

Figure 1:
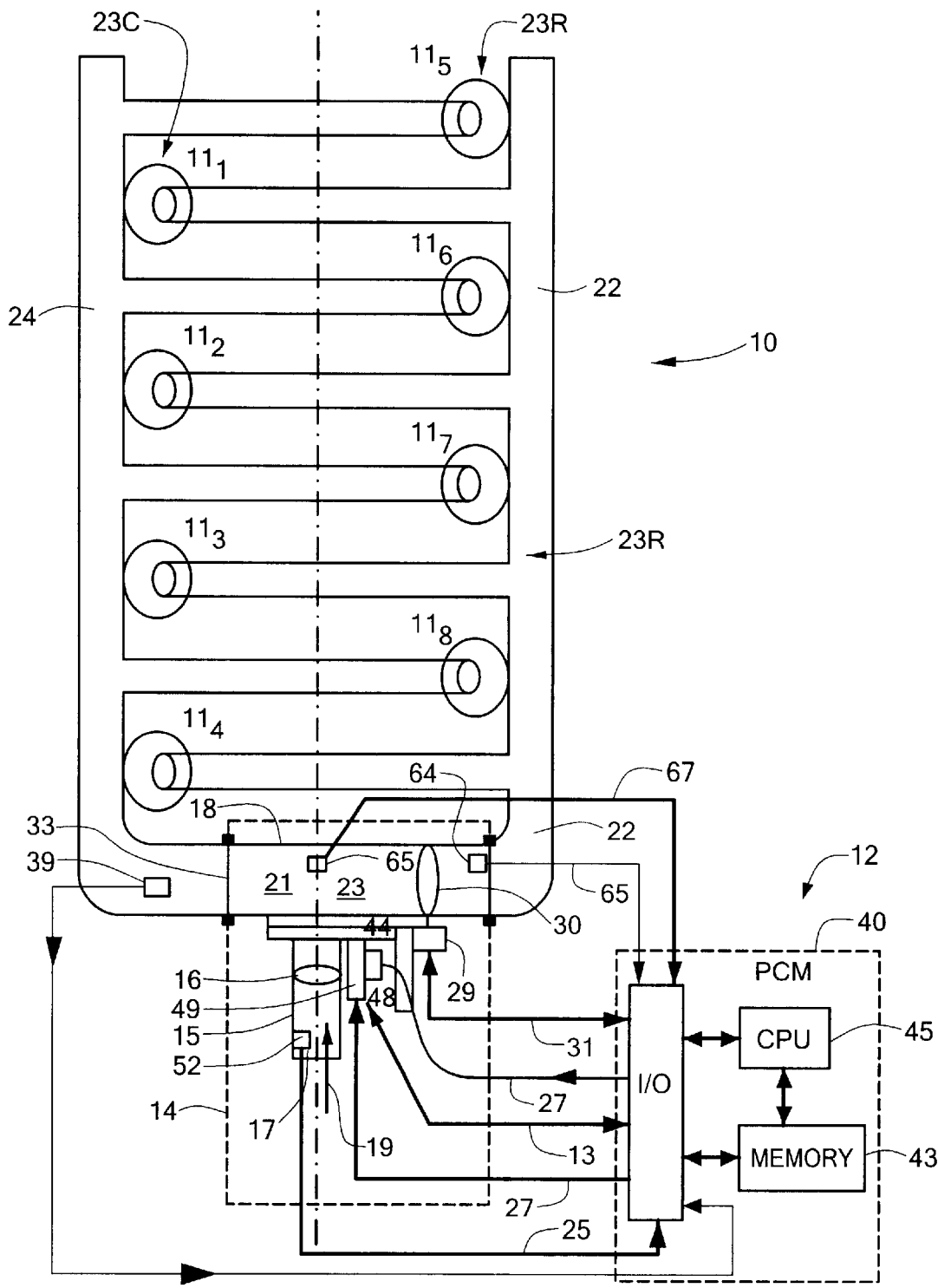
FIG. 1 is a diagram a variable displacement internal combustion engine system according to the invention.

Referring now to FIG. 1, a V-8 internal combustion engine 10 is shown adapted to operate with all eight cylinders $11_1$–$11_8$ or with only four of the eight cylinders, here cylinders $11_1$–$11_4$ during different engine operation modes, to be described. Suffice it to say here that the engine 10 includes an air induction system 12 for managing the flow of the intake air charge to the engine 10. The induction system 12 includes an intake airflow control system 14 for controlling airflow to a main throttle body 15 of the engine 10 and a powertrain control module 40.

The intake airflow control system 14 includes main throttle body 15 and plenum throttle body 18 along with mounting frames 40 for airflow control devices. The intake airflow control system 14 is disposed at the very front end and upstream of the left manifold plenum 24 and the right manifold plenum 22 which fed air to cylinders $11_1$–$11_4$ and $11_5$–$11_8$, respectively, in a corresponding pair of banks 23L, 23R respectively, of the engine 10. The intake airflow control system 14 governs the total intake air charge to the engine 10 as well as the air charge through to each plenum 22, 24 during normal engine operation and during changes in the different engine operation modes.

Thus, main throttle body 15 is provided having an outlet 17 for feeding air, represented by arrow 19, to a pair of input ports 21, 23 of plenum throttle body 18, each one of such input ports 21, 23 being coupled to feed air 19 to a corresponding one of the pair of manifold plenums 24, 22 respectively. The open ends of the plenum throttle body 32, 33 are fastened to the open ends of manifold plenums 22, 24, respectively. The main throttle body 15 has a main throttle plate 16 disposed therein to control airflow passing to the outlet 17 of the main throttle body 15. One of the pair of plenums 22, 24, here plenum 22, has a plenum throttle plate 30 for controlling air from one of the pair of input ports, here port 23 of the intake air control system 14 coupled thereto to cylinders in the bank of cylinders coupled thereto, here to cylinders $11_5$–$11_8$.

A main mass airflow (MAF) sensor 52 is mounted upstream of a main throttle plate 16 and detects the total mass flow rate of air 19 to the outlet 17 of the main throttle body 15. The sensor 52 transmits an air mass flow rate signal on line 25, such signal being indicative of the air mass flow into the main throttle body in pounds per minute (lbs/min). The signal produced by sensor 52 is fed to a powertrain control module PCM 40. The main mass airflow sensor 52 preferably takes the form of hot wire anemometer.

A plenum mass airflow sensor 39 is disposed at the entrance of the left plenum 24 and a sensed signal representative of the measured mass airflow (MAF) to the left plenum 24 is sent to the PCM 40.

A main throttle plate position sensor 48 is of any conventional design and preferably utilizes a rotary potentiometer to generate a main throttle plate (TP) angle signal 13. The main throttle plate is controlled by a foot of a driver acting on a gas pedal commonly referred to as the accelerator. The throttle plate is commonly actuated by a mechanical system composing of linkage(s) and return spring(s), not shown in FIG. 1. Alternatively, when the engine is equipped with an electronic throttle control (ETC) system, the throttle plate is actuated by a main throttle plate actuator 49 which controls main throttle plate position to accordance with the control signal on line 27 from PCM 40. The main throttle plate actuator 49 preferably takes the form of DC motor. The control strategy of the present invention is applicable for both TP actuator systems.

A plenum throttle plate actuator 29 receives the control signal on line 31 from PCM 40 to make the plenum throttle plate (PTP) 30 to stop either at a fully open or fully close position. The plenum throttle plate actuator 29 preferably utilizes a DC Motor or a rotary solenoid, which has a repeated angular rotation rate with a period greater than the maximum manifold filling time constant.

As soon as the inducted air charge passing through the main throttle body 15 and plenum throttle body 18, the air charge is conducted into right manifold plenum 22 and left manifold plenum 24. The air charge in the right manifold plenum 22 is conducted into the cylinders $11_5$–$11_8$ at the right bank 23R. Similarly, the air charge in the left manifold plenum 24 is conducted into cylinders $11_1$–$11_4$ at left bank 23L. The engine exhaust gas from the exhaust gas recirculation (EGR) system (not shown) enters the plenum throttle body 18 through am EGR entrance port, not shown, to allow the exhaust gas to mix with intake air charge.

A manifold absolute pressure (MAP) sensor 66 detects manifold absolute pressure and transmits a MAP (manifold absolute pressure) signal on line 67 to PCM 40. The MAP sensor 66 is located near the entrance of the plenum throttle body 18. Intake and exhaust valves deactivating system (not shown) deactivates intake and exhaust valves of right engine bank during VDE operation mode.

Method and Control Strategy

The normal engine operation mode (NEOM) refers to the condition of engine that operates with eight cylinders $11_1$–$11_8$ inducting approximately equal amounts of air charge into these eight cylinders during a normal engine operation cycle. During the normal engine operation mode with all eight cylinders $11_1$–$11_8$ operating, the plenum throttle plate 30 is kept widely open. The VDE operation mode (VDEOM) refers to the condition of engine 10 that operates with only the four cylinders $11_1$–$11_4$ in the left bank inducting approximately equal amount of air charge into these four cylinders $11_1$–$11_4$ during an engine operation cycle. Thus, during the VDE operation mode, the plenum throttle plate 30 is kept completely closed. The VDE transition mode (VDETM) refers to the engine operates either from NEOM to VDEOM, a transition for saving fuel or from VDEOM to NEOM, and a transition for power. In order to understand how total engine MAF (total engine torque output) varies during both saving fuel and power transitions, the following analysis is made with an assumption that the main throttle plate 16 is maintained in a fixed position throughout the both transitions.

During a saving fuel transition, wherein engine operation mode transitions from using all eight cylinders $11_1$–$11_8$ to using only four of the eight cylinders (cylinders $11_1$–$11_4$), the plenum throttle plate (PTP) 30 is smoothly rotated by a PTP actuator system 29 from a wide open position (90 Degrees) to a completely closed position to provide a reduction in airflow to plenum 22. Such action is made to only moderately increasing the airflow in plenum 24. Although the transition is smooth, the total engine torque (total engine MAF) declines steadily through out the saving fuel transition period. In this invention, an airflow compensation system has been designed to maintain the total engine MAF a constant to meet the demand of an operator who holds the accelerator pedal in a fixed position through out the transition period. As soon as the saving fuel transition starts, the airflow compensation system is actuated simultaneously to increase the total engine MAF a proper amount to offset the engine MAF loss. Therefore, with an additional amount of MAF (i.e., Δ MAF) that is generated from an airflow compensation system, the total engine torque output is maintained at the same level through out the saving fuel transition. Similarly, during a power transition, wherein the engine transitions from an engine operation mode using four of the eight cylinders (cylinders $11_1$–$11_4$) to using all eight cylinders $11_1$–$11_8$, the plenum throttle plate 30 is smoothly rotated by a PTP actuator system 29 to open to plenum throttle plate 30 from a completely closed position (0 Degrees) to a wide open position (90 Degrees), thereby increasing in airflow to plenum 22 and a moderately decreasing the airflow in plenum 24. During this power transition, the total engine torque output (total engine MAF) increases steadily through out power transition. As soon as the power transition starts, the airflow compensation system is actuated simultaneously to reduce the total engine to MAF a proper amount to offset the total engine MAF gains. Again, the airflow compensation system is responsible for maintaining a-constant total engine torque output level throughout engine power transition period. If the operator steps onto, or releases from, the accelerator pedal (i.e., a tip-in or tip-out), the operator should sense that the engine/vehicle is still under the command of the operator without sensing the engine mode transition is under way. Because, in addition to the fact that the PTP actuator system maintains the total engine output continuously and the airflow compensation system minimizes the variation on the level of total engine torque output, any MAF change from the additional activities on the main throttle plate (TP) 16 by the operator during the mode transition will simply be superimposed onto it.

It is important to properly fire up cylinders in both banks during the mode transition period. The proper amount fuel must be injected into the cylinders during every engine cycles. The air charge that is inducted into each cylinder through out this period is measured at each PIP edge, where PIP is the Profile Pick Up signal (not shown) sent from the Electronic Distributorless Ignition System (EDIS) (not shown) to PCM 40 and which comprises a series of pulses, each of which has a period equal to the time for a crankshaft sprocket to rotate an angle encompassing 90 degrees crank angle for an eight cylinder engine. It is worth noting that EDIS transmits the PIP signal by processing a crankshaft position signal (not shown) from a crankshaft position sensor (not shown). The analogy signals from main MAF sensor 52 and plenum MAF sensor 39 are processed by PCM 40 to obtain MAF in pounds per second at each PIP edge and consequently the air charge per cylinder.

It is evident that the PTP actuator and airflow compensation systems not only provide a smooth response to the demand of the operator during the engine mode transition, but also maintain combustion stability of the cylinders throughout the engine mode transition period. Because the creation of the PTP actuator system and airflow compensation system in the present invention has enabled the air charges that is inducted into every cylinder of the engine to be controlled in a smooth and manageable manners, it is possible to measure or calculate the MAF at every PIP transition edge consequently providing a desirable combustible air fuel mixture to the engine. Therefore, any adverse impacts on the engine performance, fuel economy and exhaust gas emissions made during the engine mode transitions are greatly reduced. The airflow compensation systems and control will be described in connection with FIGS. 12, 13, 13A, 13B, 13C, 13D, 13E and 13F. The time variation of MAF of the right, left bank and the total engine during saving fuel and power transition periods with, and without, the airflow compensation system will be described in connection with FIGS. 4A, 4B, 5A and 5B.

It is important to note that the period of the engine mode transition equals to the actuating period of the plenum throttle plate 30 from the open to closed position or from the closed to open position. In the present invention, the typical period of engine mode transition is selected from a few hundred milliseconds, as a short mode transition period, to as long as several seconds, as a long mode transition period. It is desirable to have a short transition period thereby avoiding maneuverability problem. However, the short transition period is limited by the ability of measuring MAF accurately from a PIP edge to the next and predicting the MAF at the next PIP edge when the fuel injection period will be scheduled.

The optimum design for an engine mode transition system is the one which maintains the engine in continuous and smooth torque output operation with high fuel combustion efficiency and low exhaust gas emissions. The PTP actuator system and airflow compensation system have been designed to maintain the total engine airflow unchanged through out the mode transition. However, should the operator happen to make a large tip-in or tip-out movement during the engine mode transition having the short mode transition, the air charge inducting process becomes a typical transient air and transient fuel handling problems. The following is a brief summation of the method of calculating the MAF at each PIP transition and the cylinder air charge in pounds of air mass, M_CYL, at end of each intake stroke during mode transition: The correct air fuel (A/F) ratio must be determined for the cylinders in both banks. Therefore, both mass airflow through the right bank, $MAF_R$ and mass airflow through the left bank, $MAF_L$, must be determined at each PIP transition edge. A modem engine usually has a MAF sensor (i.e., MAF sensor 52), which measures the total MAF of the engine, $MAF_T$. However, if the PTP actuator rotates repeatedly (e.g., a high torque solenoid or motor), the MAF sensor 39 can be eliminated. Because the value of $MAF_R/MAF_L$ at every PIP transition edge can be calculated from the engine mapping data using the empirical equation, $MAF_R/MAF_L$=f1(engine rpm)*f2(TP)*f(time since the transition start), where the time since the transition start is equivalent of the PTP angle. The bank ratio of MAF is essentially as a function of PTP angle and it is adjusted by the engine rpm and TP angle, namely, the value of f1 and f2 are within 1 to 1.5. Alternatively, a PTP angle monitor (ratiometric potentiometer) may be added (not shown) to measure the PTP angle at every PIP transition edge. In such embodiment the actual PTP angle is used instead of using time, namely, $MAF_R/MAF_L$=f1(engine rpm)*f2(TP)*f(PTP), where PTP angle is monitored from A to D conversion immediately after the PIP transition interrupt (PTP rotates at a constant angular level, this embodiment or at a desirable MAF level at each PIP transition edge). Finally, Based on the bank MAF ratio calibration method describes above, $MAF_L$ and $MAF_R$ can be derived as, $MAF_L=MAF_T/(1+MAF\_RATIO)$ and $MAF_R=MAF_T*(MAF\_RATIO/(1+MAF\_RATIO))$. Where $MAF\_RATIO=MAF_R/MAF_L$. Alternatively, two MAF sensors are used as described above in connection with FIG. 1. As described, the sensor 39 is used to replace the MAF ratio calibration described above.

In order to maintain good combustion stability for every cylinder of the engine throughout the engine mode transition, the intake air charge (or MAF) inducted into each cylinder must be calculated for approximately a PIP period (which spreads over three PIP edge transitions during the intake stroke). Therefore, the sequential time grid is to coincide with the PIP transition edges in a sequence as . . . ,i−2,i−1,i,i+1,i+2, . . . from the past to the present, at grid i, and to the future and the unit grid interval is equal a half PIP period. First, it is necessary to calculate the mass of air which passes through the mass airflow sensor during the most recent intake event (from i−2 to i). Second, the raw MAF sampled at these grid points must be corrected to compensate for the drift of mass airflow sensor due to the current temperature of the air charge deviates from the temperature when the base calibration for the transfer function from the analog signal to the MAF. Knowing durations of these half periods, the mass of air that measured by a MAF sensor 52 during an intake stroke (a PIP period can be calculated as, $M\_CYL=\{[(MAF_{i-2}+MAF_{i-1})*\Delta T_{i-2,i-1}+(MAF_{i-1}+MAF_i)*\Delta T_{i-1,i}]/2\}$*air meter drift corrections, where the first and the second terms on the right side of the equation are respectively inducted cylinder air charge during the first half PIP period and the second half PIP period. It is noted that M_CYL, the mass air charge in a cylinder per intake stroke, calculated from the above equation works for the engine operates at non-transient condition, which characterizes with slowly varying MAF. If a tip in or a tip out process is accompanying with this intake stroke, the mass of air that inducted into the cylinder during an intake stroke after compensating once with tip in or tip our process, $M\_CYL_1$, can be calculated as, $M\_CYL_1=AIR\_CHG\_CYL-AIR\_CHG\_MANIFOLD\_FILLING$. Where $AIR\_CHG\_MANIFOLD\_FILLING=(TI\_TC)*[(MAF_{i-1}+MAF_i)*\Delta T_{i-1,i}-(MAF_{i-2}+MAF_{i-1})*\Delta T_{i-2,i-1}]/2$, if it is a tip in process. Where $AIR\_CHG\_MANIFOLD\_FILLING=(TO\_TC)*[(MAF_{i-1}+MAF_i)*\Delta T_{i-1,i}-(MAF_{i-2}+MAF_i)*\Delta T_{i-2,i-1}]/2$, if it is a tip out process. Where TI_TC & TO_TC are respectively tip-in time delay constant and tip-out time delay constant and they are a function of intake manifold to engine displacement ratio. The $M\_CYL_1$, calculated is only the measured air charge passing through the upstream of the Throttle Plate during a period of an intake stroke. Although it is corrected to account for the delay due to the manifold filling yet because a delta time is needed to deliver the air mass from the upstream of the TP to the intake valve of the cylinder, the actual M_CYL during the intake stroke i−2 to i may not only be inducted into different cylinders but also the inducted air mass at these grids are modified. The induction delay of the air mass measured at the upstream of the TP depends on the design of the intake manifold, lengths of the intake manifold runners, engine RPM and MAF etc. The method that deals this delay problem is generally known as air manifold dynamics. When an engine is operating while its MAF changes rapidly, the air manifold dynamics must be taken into account by using a proper data filtering process to compensate the discrepancy that the amount of air mass that is measured by the mass airflow sensor is not equal to the amount of air that is inducted into a cylinder during the same period of time. $M\_CYL_1$ becomes $M\_CYL_2$ after compensating $M\_CYL_1$ with air manifold dynamics. Now, the final M_CYL equals $M\_CYL_2$. Similarly, it is necessary to schedule a fuel injection pulse at least a PIP period before the actual fuel injection starts. The method that predicts the induction air mass at a time with a period of the scheduling delay in the future is generally known as air anticipation. It is preferable to use air charge estimating method in U.S. Pat. No. 5,331,936, inventors Messih et al., assigned to the assignee of the present invention, and other technical reports known to the art which deal with transient air and fuel situation during the engine short mode transitions.

Figure 3:
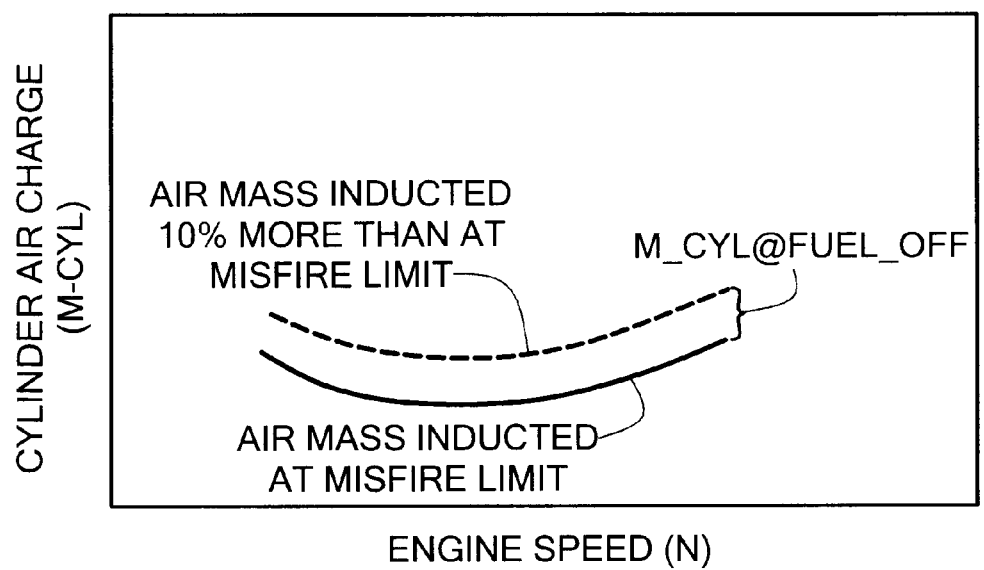
FIG. 3 is a diagram showing the cylinder air charge, M_CYL, as a function of engine speed immediately before flow to such cylinder is enabled or disabled.

Immediately before disabling or enabling the cylinders in one of the two banks thereof, the inlet airflow to such one of the banks is kept to a minimum for a minimum torque output while preventing it from misfiring, as will be described in more detail in connection with FIG. 3. The position (angle) of PTP at which the right cylinder bank is disabled or enabled is respectively PTPA@DIS, and PTPA@ENA.

Transition From NEOM to VDEOM

As soon as PCM 40 detects that the engine is operating favorably (i.e., so that the engine can change from NEOM to VDEOM, FIG. 2), the PCM 40 transmits a signal to activate the plenum throttle plate actuator 29 first moving a NEOM latch (not shown) to unlock the plenum throttle plate (PTP) 30 and at the same time, applying and reversing the direction of electric current to the driver of the solenoid to preferably rotate the plenum throttle plate (PTP) 30 at a constant angular velocity or at a desirable MAF level at each PIP transition edge until the PCM 40 detects that the inducted air mass in the cylinder of the right bank decreases to within M_CYL@FUEL_OFF band, (i.e., a calibration band bounded between $1.1*M\_CYL_{misfire\ limit}$, an upper boundary and $M\_CYL_{misfire\ limit}$, a lower boundary. The PCM 40 provides commands to sequentially closed intake and exhaust valves and sequentially shut off fuel injection. The deactivation of intake and exhaust valves should be in synchronization with the injection fuel shut off when the torque output from the disabled cylinder is minimum. As the plenum throttle plate 30 (PTP) approaches to a completely closed position, the arm of the PTP shaft (not shown) first turns off the power supply switch (not shown) then stops on a spring loaded seat (not shown) which drives a VDEOM latch (not shown) to lock the plenum throttle plate (PTP) 30 in a completely closed position. It is noted that the $M\_CYL_{misfire\ limit}$ is the cylinder air charge in pounds of mass immediately before the cylinder is shut off its fuel (or turn its fuel on for VDEOM to NEOM transition M_CYL is greater than the $M\_CYL_{misfire\ limit}$), which provides a marginal cylinder combustion stability at a stoichiometric air fuel ratio (solid line in FIG. 3). Here the marginal cylinder combustion stability refers to the condition of cylinder combustion as the cycle-to-cycle combustion variation starts to grow. The M_CYL@FUEL_OFF band is a calibrated M_CYL band. It generates a minimum torque yet it does not misfire as the cylinder is shut off its fuel (or turn its fuel on for VDEOM to NEOM transition) in a stoichiometric air fuel mixture with mass of cylinder air charge confined in the M_CYL@FUEL_OFF band. In an alternative embodiment, the desirable total transition time for an engine mode change as well as the desirable angular velocity of the PTP is controlled by a DC motor which is driven with proper input duty cycle signal from the PCM 40. This motor driver system has the advantage of not controlling the engine mode transition period but is able to slow down the angular velocity of the shaft of PTP near the PTP angle where the cylinders on the right bank is about to be disabled (which is true for VDEOM to NEOM transitions). Again, the intake and exhaust valves in the right engine bank of cylinders 23R must be deactivated and closed to prevent the residual fuel in intake ports from escaping to the exhaust system.

Figure 2:
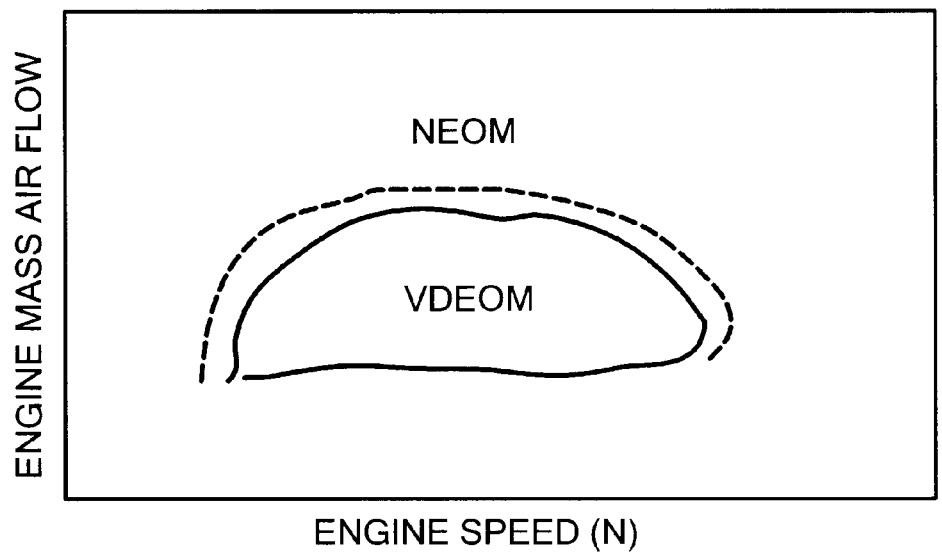
FIG. 2 is a diagram showing conditions for determining whether the engine of FIG. 1 is operating in a normal engine mode, a VDE mode and transitioning between such modes.

Referring now to FIG. 2, the desirable engine operation zones for NEOM and VDEOM are depicted where the VDEOM zone is bounded within the solid line and NEOM zone is outside the dotted line. The area between the solid and dotted lines is the hysteresis zone. The boundary of VDEOM zone, defined in FIG. 2 as a function of engine mass airflow and engine RPM, is mapped from the calibration data of an engine or vehicle test. The criteria of establishing the boundary of the zone of VDEOM are: (1) The engine MAF at the boundary is at a constant percentage of the engine MAF when the engine operates at the wide open throttle and with a same engine RPM. The engine should not show the signs of strain; and (2) the boundary should be kept away from the condition for a gear shifting. The method for determining the engine operation mode transition will be described in connection with FIGS. 7, 8 and 9.

Figure 4A:
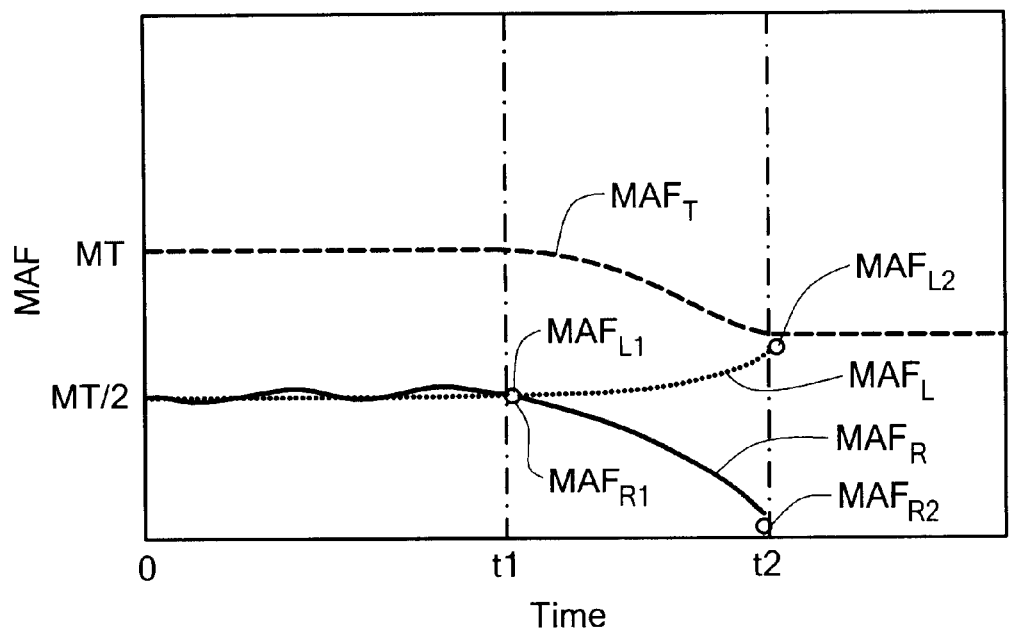
FIG. 4A is a time history showing the distribution of total MAF to the engine of FIG. 1 as such engine transitions from the normal engine operation mode to the VDE operation mode with a main throttle plate of the engine of FIG. 1 at a fixed position.

Referring now to FIG. 4A, the time history of the mass air flow (MAF) to each one of the plenums 22, 24 is shown as a result of closing the plenum throttle plate 30 during the mode transition period with the main throttle plate held in a fixed position. It is noted that with the main throttle plate at a fixed position, because initially all eight cylinders were operational whereas at the end of the transition only four cylinders are operational, the total mass airflow to the only four operating cylinders reduces an amount $\Delta_{MAF}$ from the total mass airflow to all previously operational eight cylinders. Such reduction is the result of the removal of the vacuum pumping action in the main throttle body from the loss of four previously operating cylinders.

Thus, FIG. 4A shows that at time t=0, if the operator is holding the main throttle plate 16 and the engine is operating in the normal engine mode with all eighth cylinders $11_1$–$11_8$. It is noted that the total MAF at the main throttle body 15 outlet 17 is MT. At time t1 the transition from the normal engine operation mode to the VDE mode commences and is completed at time t2. Thus, during the normal engine operation mode, with the plenum throttle plate 30 fully opened, the total airflow at outlet 17 MT is divided equally between the two plenums 22 and 24 with each one of the plenums receiving a MAF of MT/2. At time t1 the plenum throttle plate 30 closes until it is fully closed at time t2. It is noted that between time t1 and t2 the MAF to the left plenum 24 increases (as indicated by the line, $MAF_{L1}$ to $MAF_{L2}$) while the MAF to the right plenum 22 decreases (as indicated by the line, $MAF_{R1}$ to $MAF_{R2}$). However, as noted above, with the main throttle plate at a fixed position, because initially all eight cylinders were operational whereas at the end of the transition only four cylinders are operational, the total mass airflow to all four cylinders reduces an amount $\Delta_{MAF}$, namely MT–$MAF_{L2}$, from the total mass airflow to all previously operational eight cylinders.

In order to compensate for such airflow loss, two embodiments are described. In one embodiment, the airflow compensation includes providing a compensation control signal to the main throttle plate, as when electronic throttle control (ETC) is used. In the other embodiment, an airflow by-pass structure, to be described in more detail in connection with FIGS. 13, 13A, 13B, 13C, 13D, 13E and 13F, is coupled to the main throttle body upstream of the main throttle to adjust airflow downstream of the main throttle as the number of operational cylinders in the engine changes. These processes approximately result in a torque output that is similar to the torque output which would be produced with a non-variable displacement engine (VDE). Thus, with either embodiment, the airflow compensation operates to produce the airflow time history shown in FIG. 4B.

Figure 4B:
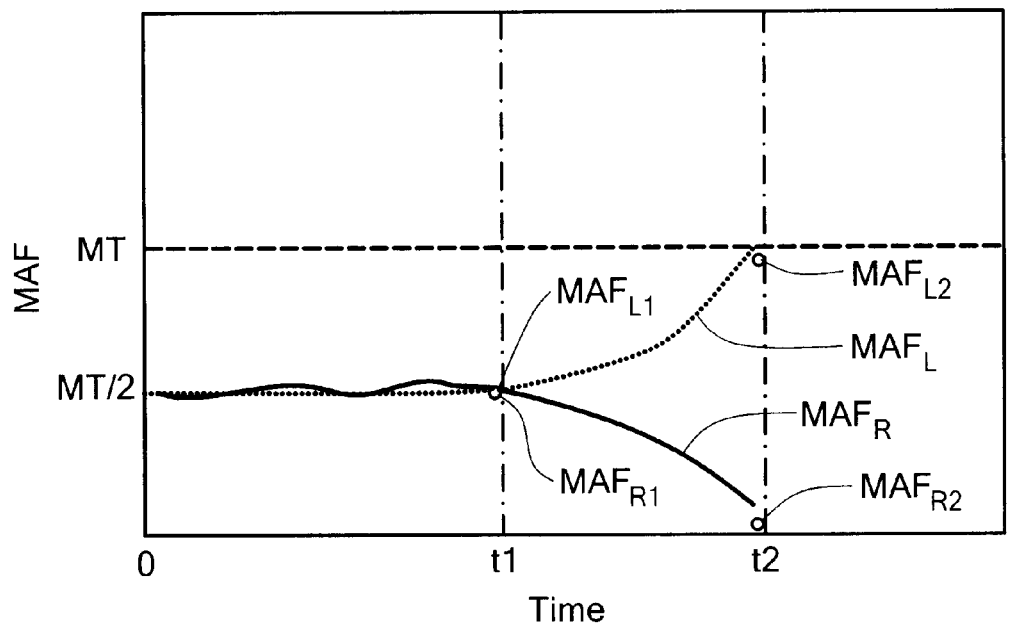
FIG. 4B a time history showing the distribution of total MAF to the engine of FIG. 1 as such engine transitions from the normal engine operation mode to the VDE operation mode as in FIG. 4A with an airflow compensation system according to the invention.

Thus, referring to FIG. 4B, at time t1 the transition from the normal engine operation mode to the VDE mode commences and is completed at time t2. Thus, during the normal engine operation mode, with the plenum throttle plate 30 fully opened, the total airflow at outlet 17, MT, is divided equally between the two plenums 22 and 24 with each one of the plenums receiving a MAF of MT/2. At time t1 the plenum throttle plate 30 closes until it is fully closed at time t2. It is noted that between time t1 and t2 the MAF to the left plenum 24 increases (as indicated by the line, $MAF_{L1}$ to $MAF_{L2}$) while the MAF to the right plenum 22 decreases (as indicated by the line $MAF_{R1}$ to $MAF_{R2}$). It should be noted that during the transition between time t1 and t2 $MAF_R$+$MAF_L$=MT. Further, because of the airflow compensation, the total mass airflow to the engine 10 is maintained at a constant level, MT.

Transition From VDEOM to NEOM

The process for the mode transition from VDEOM to NEOM should be the same as that from NEOM to VDEOM, except the direction and the sequence are reversed. The following description is a summary of the sequence of the task that the PCM 40 should be programmed during this transition:

(1) The necessary condition for the engine to initiate a VDEOM to NEOM transition is that the engine is operating at a special steady state condition for a time period of no less than 4to8_tm, a calibration time variable in second. The engine operating at a special steady state condition means when it is operated under the constrains of the following two conditions: (a) The engine speed and MAF measured at each PIP transition is define as a data point in FIG. 2, which must be within the NEOM zone bounded by the solid line. (b) At the end of the special steady state period, 4to8_tm, the value of the average MAF are in the NEOM zone bounded by the dotted line (FIG. 2). A process to detect for initiating a VDEOM to NEOM transition is to be described in connection with FIG. 9 (Step 902 to Step 906).

(2) Similar to the transition from NEOM to VDEOM, as soon as PCM 40 detects that the engine is operating favorably for a power transition, the PCM 40 transmits a signal to activate the plenum throttle plate actuator 29 firstly moving the VDEOM latch (not shown) to unlock the plenum throttle plate (PTP) 30 and at the mean time, applied and reverse the direction of electric current that drivers the solenoid to preferably rotate the plenum throttle plate (PTP) 30 at a constant angular velocity or at a desirable MAF level at each PIP transition edge until the PCM 40 detects that the inducted air mass in the cylinder of the right bank increases to approximately equal to or just greater than the inducted cylinder air mass that reaches misfire limit, a calibration value, the PCM 40 commands to sequentially activate intake and exhaust valves and sequentially turn on the fuel injectors of the right cylinder bank. The activation of intake and exhaust valves on the right cylinder bank should be in synchronization with turning the fuel injectors on when the torque output from the enabled cylinder is minimum. As the plenum throttle plate 30 (PTP) is approaching to a completely open position In an alternative embodiment, the desirable total transition time for an engine mode change as well as the desirable angular velocity of the PTP is controlled by a DC motor, which is driven with proper input duty cycle signal using calibrated duty cycle input function, from the PCM 40. The advantages are similar to the saving fuel mode transition.

(3) As soon as the transition from VDEOM to NEOM starts, $M\_CYL_R$ and $M\_CYL_L$ are calculated at every PIP transition. The method of the calculation has described in connection with METHOD AND CONTROL STRATEGY.

Figure 5A:
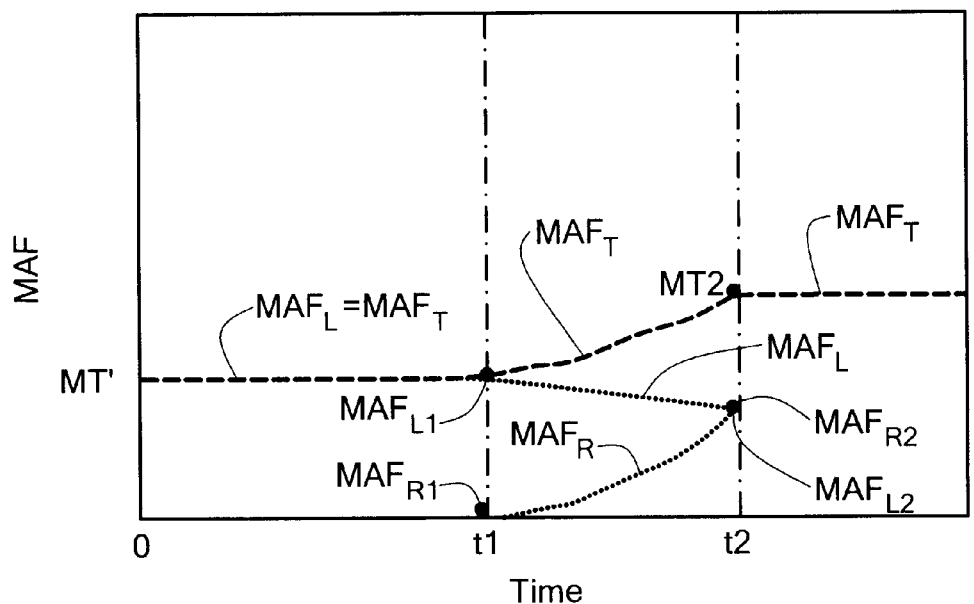
FIG. 5A is a time history showing the distribution of total MAF to the engine of FIG. 1 as such engine transitions from the VDE engine operation mode to the normal engine operation mode with a main throttle plate of the engine of FIG. 1 at a fixed position.

Referring now to FIG. 5A, the time history of the mass air flow (MAF) to each one of the plenums 22, 24 is shown as a result of opening the plenum throttle plate 30 and with such throttle plate at a constant throttle angle. Thus, FIG. 5A shows that at time 0 the engine is the VDE engine mode with only four cylinders $11_1$–$11_4$. It is noted that the total MAF at the main throttle body 15 outlet 17 is MT'. At time ti the transition from the VDE engine operation mode to the normal engine operation mode commences and is compete at time t2. Thus, during the VDE engine operation mode, with the manifold throttle plate 30 fully closed, the total airflow at outlet 17 MT' is coupled to only plenum 24. At time t1 the plenum throttle plate 30 opens until it is fully opened at time t2. It is noted that between time t1 and t2 the MAF to the left plenum 24 decreases (as indicated by the line, $MAF_{L1}$, to $MAF_{L2}$) while the MAF to the right plenum 22 increases (as indicated by the line, $MAF_{R1}$ to $MAF_{R2}$). It should be noted that during the transition between time t1 and t2 the total engine MAF changes from $MAF_{L1}$ (or MT') to $2\ MAF_{L2}$.

It is noted that, with the main throttle plate at a fixed position, because initially only four cylinders were operational whereas at the end of the transition all eight cylinders are operational, the total mass airflow to all eight cylinders increases an amount $\Delta'_{MAF}$, namely, $2\ MAF_{L2}$.-MT', from the total mass airflow to the previously operational four cylinders. Such increase is the result of the added vacuum pumping action in the main throttle body from the additional four previously non-operating cylinders.

Figure 5B:
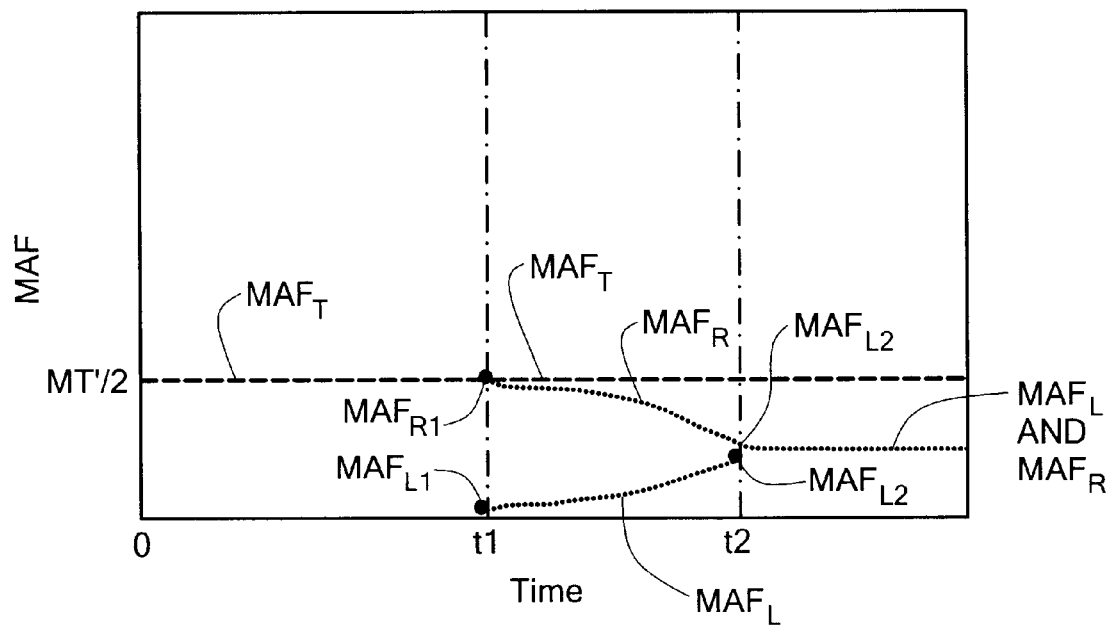
FIG. 5B is a time history showing the distribution of total MAF to the engine of FIG. 1 as such engine transitions from the VDE engine operation mode to the normal engine operation mode as in FIG. 5A with an airflow compensation system according to the invention.

Thus, FIG. 5B shows the ideal power transition scenario that at time 0 if the operator is holding the main throttle plate 16 and the engine is operating in the VDE mode with only four cylinders $11_1$–$11_4$. It is noted that the total MAF at the main throttle body 15 outlet 17 is MT'. At time t1 the transition from the VDE mode to the normal engine operation mode commences and is completed at time t2. Thus, during the VDE mode, with the plenum throttle plate 30 fully closed, the total airflow at outlet 17 MT' passes only to plenums 24. At time t1 the plenum throttle plate 30 opens until it is fully opened at time t2. It is noted that between time t1 and t2 the MAF to the left plenum 24 decreases (as indicated by the line, $MAF_{L1}$ to $MAF_{L2}$) while the MAF to the right plenum 22 increases (as indicated by the line, $MAF_{R1}$ to $MAF_{R2}$). However, as noted above, with the main throttle plate at a fixed position, because initially only four cylinders were operational whereas at the end of the transition all eight cylinders are operational, the total mass airflow from the beginning to the end of power transition is maintained the same.

In order to compensate for such airflow change, as noted above, two embodiments are described. In one embodiment, the airflow compensation includes providing a compensation control signal to the main throttle plate, as when electronic throttle control (ETC) is used as described above in connection with FIG. 12). In another embodiment, an airflow by-pass structure, to be described in more detail in connection with FIG. 13, is coupled to the main throttle body upstream of the main throttle to adjust airflow downstream of the main throttle as the number of operational cylinders in the engine changes. These processes approximate result in a torque output that is similar to the output torque which would be produced with a non-variable displacement engine (VDE). Thus, with either embodiment, the airflow compensation operates to produce the airflow time history shown in FIG. 5B. Thus, referring to FIGS. 5A and 5B, at time t1, the plenum throttle plate 30 opens until it is fully opened at time t2. It is noted that between time t1 and t2 the MAF to the left plenum 24 decreases (as indicated by the line $MAF_L$) while the MAF to the right plenum 22 increases (as indicated by the line $MAF_R$). The transition from the VDE engine operation mode to the normal mode commences and is completed at time t2. Thus, during the normal engine operation mode, the plenum throttle plate 30 is fully open. Further, because of the airflow compensation, the total mass airflow to the engine 10 is maintained at a constant level, MT' if the operator maintains the main throttle plate 16 unchanged during the engine mode change.

The PCM 40 is programmed with computer code stored in memory 43 which upon execution by the CPU 45 performs the following operations shown by the flow diagrams in FIGS. 6 through 12.

Figure 6:
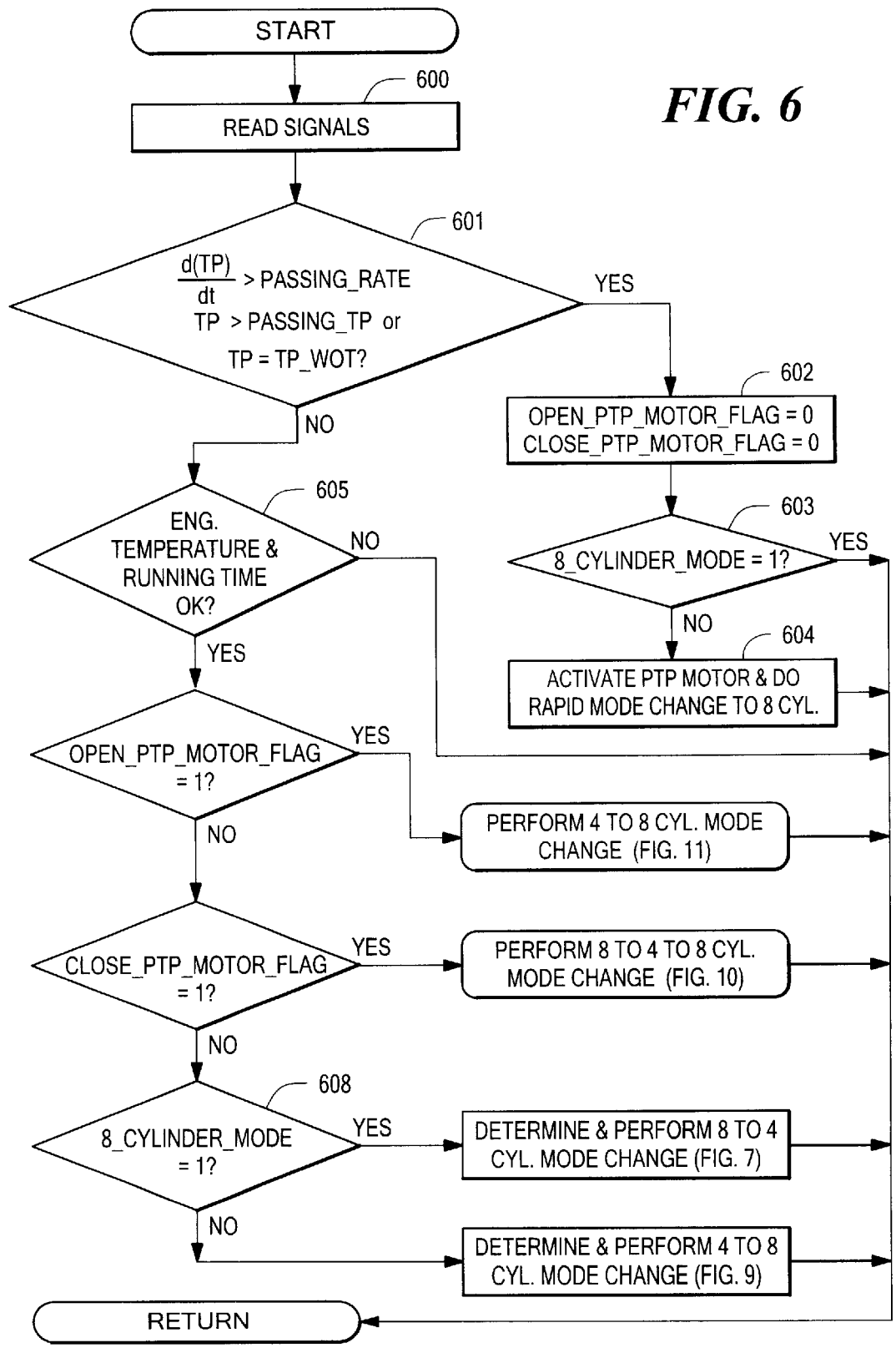
FIG. 6 is a flow diagram of the process used to transition the engine of FIG. 1 between the normal engine operation mode and the VDE engine operation mode according to the invention.

Referring to FIG. 6, in Step 600 the PCM 40 reads signals from various engine sensors i.e., $MAF_T$ as measured by the MAF sensor 52, $MAF_L$ as measured by the MAF sensor 39, MAP, engine coolant temperature (ECT not shown), air charge temperature (ACT not shown), and throttle position sensor 48 (TP). Considering now when a driver urgently demands maximum engine torque for passing a slower vehicle within a shortest time. In Step 601, the PCM 40 detects and confirms that a driver demands this urgent need if the rate of change in throttle plate 16 position, TP, is at greater than a maximum a priori established rate, PASSING_RATE combined with an indication that the TP, throttle angle, has exceed PASSING_TP or if the throttle plate 16 position TP is wide open, both indicating a quick and high operator torque demand. It is noted that PASSING_RATE is a calibration variable which is a statistical lower limit that a driver will request during a vehicle passing situation and PASSING_TP is also a calibration variable which is a statistical bench mark that combining PASSING_TP and PASSING_RATE conditions result in a very high statistical confidence for indicating a vehicle passing attempt. It is obvious that if there is any on going mode transition task being performed they must be reset as in Step 602, i.e., setting OPEN_PTP_MOTOR_FLAG=0 (indicating that a PTP open request is inactive) and CLOSED_PTP_MOTOR FLAG=0 (indicating that a PTP close request is inactive)=0.

In Step 603, if the engine is operating in the NEOM, a most desirable engine mode for completing this task, and, therefore, since there is no need to select the other mode, the process returns and it eventually proceeds to start. Otherwise, in Step 604, the plenum throttle plate 30 is driven wide open to a maximum opening rate to enable operation of the four cylinders coupled to the right plenum 22 (i.e., the engine operates with all eight cylinders). The motor 29 driving the plenum throttle plate 30 (PTP) responds to signal on line 31. The rate at which the PTP 30 opens is a function of the duty cycle of the current pulses on line 31. The direction or sense of such opening (i.e., whether the PTP 30 opens or closes) is a function of the relative phase of the pulses of current. Thus, to open the PTP 30 with a maximum rate, the duty cycle of the current pulses is 100 percent. Again, the process returns and it eventually proceeds to start.

Referring again to Step 60, when the PCM 40 does not detect the signal of quick and high torque demand in term of the conditions of change in the throttle 16, etc., the execution process continues to Step 605. A determination is made as to whether the engine operating temperature is sufficiently within normal operating temperature and the engine operating time is sufficiently long enough for potential VDE operation. That is, VDE operation is inhibited until the engine 10 has been running sufficiently long and the temperature is within normal operating range to assure, e.g., that engine friction and engine combustion stability is within an accept range. If not, the process returns and it eventually proceeds to start.

Otherwise, if in Step 606, OPEN_PTP_MOTOR_FLAG=1 (indicating that a PTP open request is active for a power transition) or a CLOSED_PTP_MOTOR FLAG=1 (indicating that a PTP close request is active for a saving fuel transition), under either one of these conditions, a transition is occurring between the normal mode and the VDE mode and the process returns and it eventually-proceeds to start. Otherwise, (i.e., the engine is not in a mode transition), the PCM 40 determines whether the engine is operating in a full eight-cylinder mode, Step 608. If it is, the PCM 40 determines whether to perform an eight cylinder to four cylinder mode change and if such is determined, the process for executing such change with a process shown by the flow diagram in FIG. 7 and to be described in more detail below.

If, in Step 608, it is determined that the engine is not operating with all eight cylinders, the PCM 40 determines whether to perform a four to eight cylinder mode change and if such is determined, the process for executing such change with a process being shown by the flow diagram in FIG. 9 and to be described in more detail below.

Figure 7:
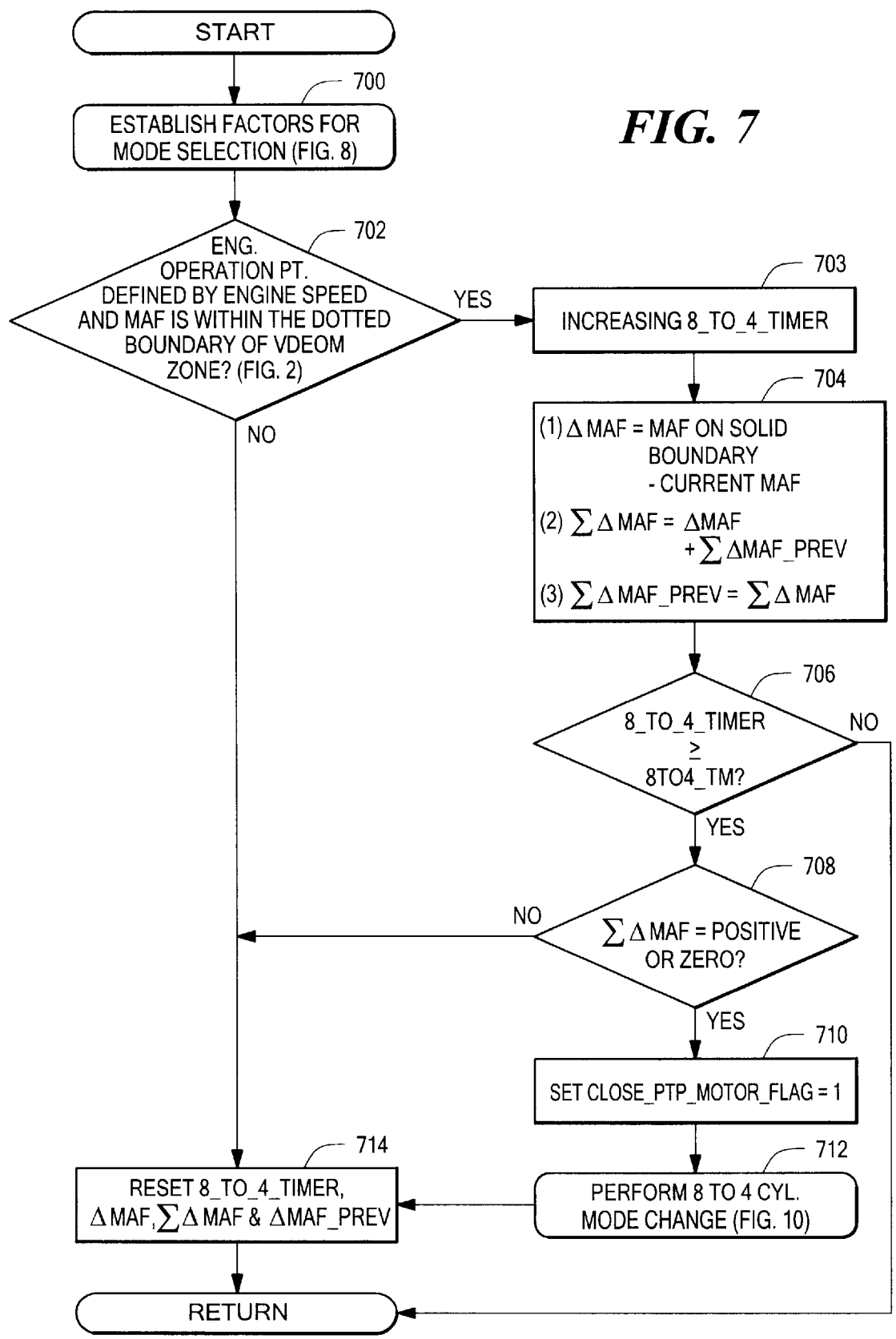
FIGS. 7–12 are flow diagrams of subroutines used in the process of FIG. 6.
Figure 8:
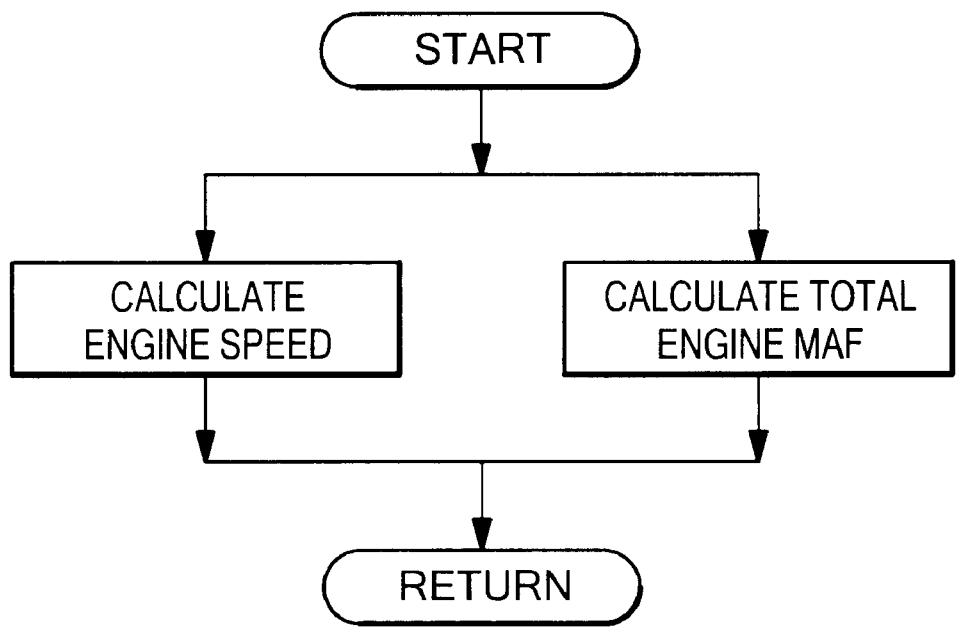

Referring now to FIG. 7, the flow diagram for the process for determining and performing an eight to four cylinder change is shown. In Step 700 the process establishes the factors for mode selection, as shown in more detail in FIG. 8. Thus, referring to FIG. 8, calculations are made for total mass airflow through the main throttle body 15 as a function of the MAF sensor 52 and engine speed as a function of PIP period. Both total mass airflow and engine speed are used to determine from the map shown in FIG. 2 whether the engine should change from eight cylinder operation to four cylinder operation. It should be noted that in FIG. 2, NEOM/VDEOM transition boundary is calibrated and established from the data collected from a test VDE vehicle whose engine has been warmed up and its parasitic load, e.g. air conditioner, dehumidifier etc., has been turned off. If this same vehicle operates with the same engine speed and vehicle resistance (e.g., road and wind resistance) but at a lower engine temperature and high parasitic load of the engine, the total engine mass airflow must be higher to overcome the above adverse factors and it may change from VDEOM to NEOM as expected.

Referring back to FIG. 7, in Step 702, the calculated engine MAF and engine speed are mapped into FIG. 2. If the mapped point is within the VDEOM zone defined by dotted boundary, a greater VDEOM zone, which includes a hysteresis band, the execution proceeds to Step 703. Now, the 8_to_4_timer is active to record the real time in the unit of millisecond. In Step 704, $\Sigma\Delta MAF$, which is a summation of all calculated $\Delta MAF$ values from 8_to_4_timer=0 to the present time, is calculated, where $\Delta MAF$ is calculated by subtracting the actual latest engine MAF from the MAF, which is the intersection of the latest engine speed and the solid boundary in FIG. 2. It is noted that the solid boundary defines a smaller VDEOM zone, which excludes the hysteresis band. The parameters $\Sigma\Delta MAF\_PREV$ defines $\Sigma\Delta MAF$ in the previous loop. In the next decision logic, Step 704 along with Step 706, determines whether the vehicle has continuously been operating within the greater VDEOM zone for a predetermined period of 8to4_tm, where 8to4_tm=x*(period of 8 to 4 mode transition) and x is a calibration constant and must be greater than 1. In Step 706, if 8_to_4 timer is less than 8to4_tm the process returns and eventually proceeds to start. Otherwise, the process proceeds to Step 708, which determines whether the summation of $\Delta MAF$, the distant measured from the solid boundary line, over a period of 8to4 tm, is positive. In another words, whether the average location of all MAF data points measured with respect to the solid boundary of FIG. 2 at each PIP transition edge is located on or within the smaller VDEOM zone. The logic between Step 702 and Step 708 is capable of detecting whether the vehicle is operating under a steady (no significant change in accelerator pedal position or MAF) and lower toque requirement (within VDEOM zone) conditions. Therefore, it is highly likely that this favorable vehicle operating condition immediately following Step 708 will continue for a period of mode transition that it will make a mode transition process smoothly. Furthermore, it has a great possibility that the engine operates in VDEOM will last as in the case when a vehicle travels in highway traffic. In order to achieve a maximum benefit on fuel and emissions for a variable displacement engine, the vehicle test must be properly performed to attain the optimum calibration for these variables e.g., shapes and relative size of NEOM and VDEOM, the width of hysteresis band and value of x. The calibration should neither trigger the mode transition too frequently nor miss a great number of mode transitions opportunities that otherwise would have achieved the fuel and emissions benefits a VDE is intended to achieve.

In Step 708, if $\Sigma\Delta MAF$ is negative, the mode transition is aborted and the 8_to_4_timer, $\Delta MAF$, $\Sigma\Delta MAF$ and $\Sigma\Delta MAF\_PREV$ are reset, Step 714. Otherwise, the positive or zero branch of Step 708 indicates that the vehicle has been operating with an average MAF which is on or within the smaller VDEOM zone. Now, the conditions for a NEOM to VDEOM transition are met and the eight to four cylinder mode transitions initiated and the CLOSE_PTP_MOTOR FLAG is set to 1, Step 710 and the eight to four cylinder mode change is performed in Step 712 to be described in more detail in connection with FIG. 10. Suffice it to say here, however, that closing of the PTP 30 is executed. When completed, the 8_to_4_timer, $\Delta MAF$, $\Sigma\Delta MAF$ and $\Sigma\Delta MAF\_PREV$ are reset, Step 714 and the process returns and eventually proceeds to start. It should be noted that during repeatedly executing the code of FIG. 7 throughout the mode transition decision period, 8to4_tm, if the decision logic statement in Step 702 is false for once, any relevant variables (RAM) defined between Step 702 and Step 708 must be reset, Step 714 and the mode transition process aborted immediately.

Figure 10:
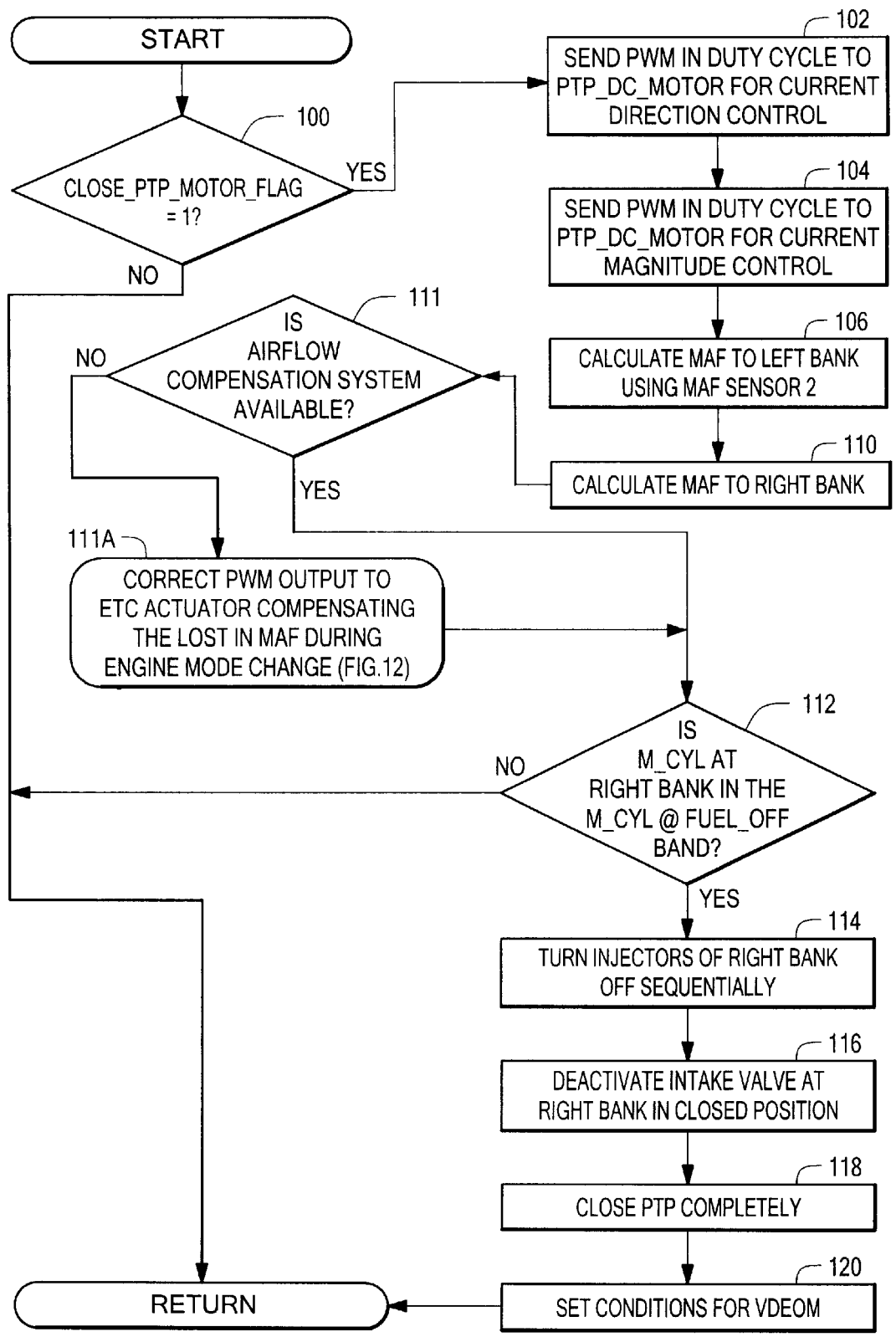

Referring now to FIG. 10, the flow diagram for the process used to perform the eight to four cylinder mode change is shown. In Step 100, the PCM 40 checks to see if the CLOSE_PTP_MOTOR_FLAG is set=1, i.e., whether there is active mode transition taking place. If no, the process returns to the main program in FIG. 7. If there is an active transition, the PCM 40 sends a train of current pulses to the PTP motor 29 having a duty cycle (i.e., a pulse width modulated PWM train of pulses) having proper phase and magnitude, Steps 102, 104, where the duty cycle for the phase control is adjusted to rotate PTP in the closing direction and the duty cycle for the magnitude control is calibrated to make the total desired transition time as well as to achieve a desirable MAF at each PIP transition edge. It is noted, that if the PTP is powered by a rotary solenoid the above motor control logic in Step 102 and Step 104 is not applicable. In this case, the choice of the rotary solenoid is for a high torque constant rotational speed which has a closed to a constant transition period.

In Step 106, the mass airflow to the left plenum 24 is calculated from the mass airflow sensor 39 disposed in the left plenum 24. The mass airflow to the right plenum 22 is calculated as $MAF_R = MAF_T - MAF_L$, in Step 110. The method of calculating MAF using a mass airflow sensor has been described in the section under the topic "METHOD AND CONTROL STRATEGY". In an alternative embodiment, the mass airflow sensor 39 used in Step 106 can be removed by empirically calculating the ratio of the MAF through right bank to the MAF through left bank which can be calibrated as a function of engine speed, TP and PTP. A more detail description of this topic has presented in METHOD AND CONTROL STRATEGY. If a variable displacement engine has an electronic throttle control (ETC) system, the requirement for adjusting airflow to compensate the gain or loss of airflow during engine mode transitions may be accomplished with ETC system instead of using the airflow compensation system described below in connection with FIG. 13. Step 111 is performed to determine whether an airflow compensation system is available. In Step 111A, a main throttle plate actuator (D.C. Motor) of an ETC system is powered by a continuous electric control pulse. Since the power input into motor is proportional to the pulse width which generally refers to the duty cycle of a given pulse width. During the saving fuel transition, the duty cycle that was calculated from ETC Proportional-Integral-Derivative (PID) controller are increased by a proper amount, $\Delta$duty cycle, which causes that main throttle plate to open a little more which results in a little more MAF ($\Delta$MAF) being inducted into cylinders throughout the transition period. Consequently, it compensates for the loss in mass airflow during the engine mode change, in accordance with a process to be described in more detail in connection with FIG. 12. The PCM 40 then, in Step 112, determines whether the coordinate of engine speed and the mass of air charge inducting into a cylinder of the right intake manifold plenum is located at the M_CYL@FUEL_OFF band of FIG. 3, where M_CYL@FUEL_OFF band is bounded between $1.1 * M\_CYL_{misfire\ limit}$, an upper boundary and $M\_CYL_{misfire\ limit}$, a lower boundary. The cylinder which is in its intake stroke and its MAF has just been measured and confirmed as within the M_CYL@FUEL_OFF band are identified. Then, the cylinder that is next in firing order should be the first fuel injector to schedule for a zero fuel pulse width (fuel cut off). However, if that cylinder is not at the right bank of the engine, cylinders 11₅–11₈, then the cylinder that is next in firing order is the first cylinder to schedule for a zero fuel pulse. Eventually, all injectors of the cylinders, cylinders 11₅–11₈ connected to the right bank of the engine are turned off sequentially (Step 114) and deactivates the intake valves of such cylinders 11₅–11₈ in a closed position, Step 116. Now, NEOM to VDEOM transition has completed and conditions that associate with the VDEOM mode must be established: 4_CYLINDER_MODE=TRUE, 8_CYLINDER_MODE=FALSE and CLOSE_PTP_MOTOR_FLAG=OPEN_PTPMOTOR_FLAG=0, Step 120. Now, the code execution process returns to the main program in FIG. 7.

Figure 9:
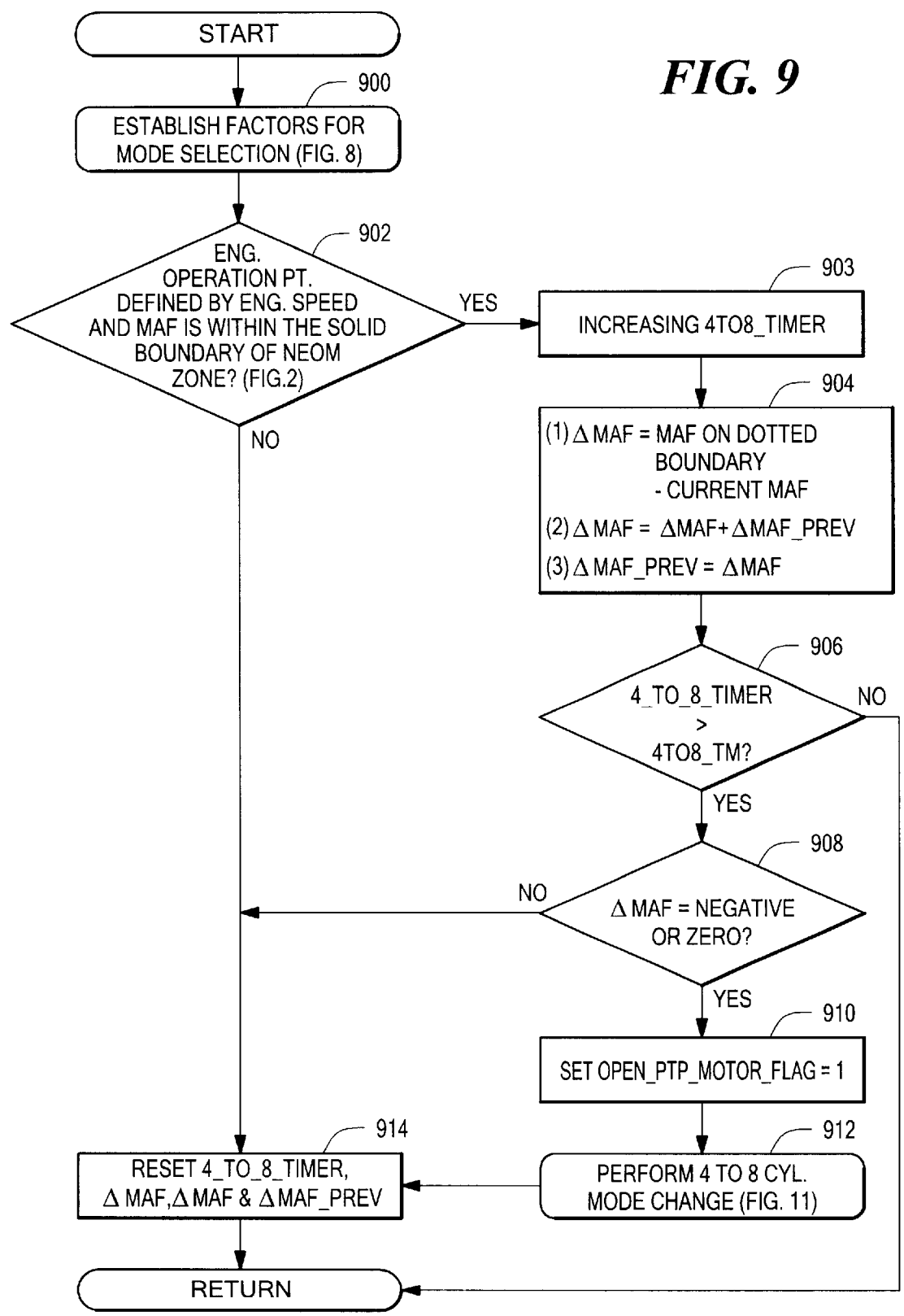

Referring now to FIG. 9, the flow diagram for the process for determining and performing a four to eight cylinder change is shown. In Step 900 the process establishes the factors for mode selection, as shown in more detail in FIG. 8. Thus, referring to FIG. 8, calculations are made for total mass airflow through the main throttle body 15 as a function of the MAF sensor 52 and engine speed, which is a function of PIP. Total mass airflow and engine speed are used to determine from the map shown in FIG. 2 whether the engine should change from four cylinder operation to eight cylinder operation. In Step 902, the calculated engine MAF and engine speed are mapped into FIG. 2. If the mapped point is within the VDEOM zone defined by solid boundary, a greater NEOM zone, which includes hysteresis band, the execution proceeds to Step 903. Now, the 4_to_8_timer is active to record the real time in the unit of millisecond. In Step 904, $\Sigma\Delta MAF$, which is a summation of all calculated $\Delta MAF$ values from 8_to_4_timer=0 to the present time, is calculated. Where $\Delta MAF$ is calculated by subtracting the actual latest engine MAF from the MAF, which is the intersection of the latest engine speed and the dotted boundary in FIG. 2. It is noted that the dotted boundary defines a smaller NEOM zone, which excludes the hysteresis band. The parameter $\Sigma\Delta MAF\_PREV$ defines as $\Sigma\Delta MAF$ in the previous loop. The next decision logic, Step 906, along with Step 902, determines whether the vehicle has continuously been operating within the greater NEOM zone for a predetermined period of 4to8_tm, where 4to8_tm=y*(period of 4 to 8 mode transition) and y is a calibration constant and it must be greater than 1. In Step 906, if 4_to_8 timer is less than 4to 8_tm the process returns and eventually proceeds to start. Otherwise, the process proceeds to Step 908, which determines whether the summation of $\Delta MAF$, the distant measured from the dotted boundary line over a period of 4to 8_tm, is positive. In other words, determines whether the average location of all MAF data points measured with respect to the dotted boundary of FIG. 2 at each PIP transition edge is located on or within the smaller NEOM zone. The logic between Step 902 and Step 908 is capable of detecting whether the vehicle is operating under a steady (no significant change in accelerator pedal position or MAF) and higher toque requirement (within smaller NEOM zone) conditions. Therefore, it is highly likely that this favorable vehicle operating condition immediately following Step 908 will continue for a period of mode transition that it will make a mode transition process smoothly avoiding use of a tedious and approximate method for handling transient air and fuel, that has been described earlier. It has a great possibility that the engine operating in VDEOM will last as in the case when a vehicle travels in a free way. In order to achieve a maximum benefit on fuel and emissions for a variable displacement engine, the vehicle test must be properly done to attain the optimum calibration for these variables e.g., shapes and relative size of NEOM and VDEOM, the width of the hysteresis band and value of y. The calibration should neither trigger the mode transition too frequently nor miss a great number of mode transitions opportunities, that otherwise would have achieved the fuel and emissions benefits of VDE.

In Step 908, if $\Sigma\Delta MAF$ is positive, the mode transition is aborted and the 4_to_8_timer, $\Delta MAF$, $\Sigma\Delta MAF$ and $\Sigma\Delta MAF\_PREV$ are reset, Step 914. Otherwise, the negative or zero branch of Step 908 indicates that the vehicle has been operating with an average MAF, which is on or within the smaller NEOM zone. Now, the conditions for a VDEOM to NEOM transition are met and the four to eight cylinder mode transition is initiated and the OPEN PTP_MOTOR FLAG is set to 1, Step 910 and the four to eight cylinder mode change is performed in Step 912 to be described in more detail in connection with FIG. 11. Suffice it to say here, however, that opening of the PTP 30 is executed. When completed, the 4_to_8_timer, ΔMAF, ΣΔMAF and ΣΔMAF_PREV are reset, Step 914 and the process returns and it eventually proceeds to start. It should be noted that during repeatedly executing the code of FIG. 9 through out the mode transition decision period, 8to4_tm, if the decision logic statement in Step 902 is false for once, any relevant variables (RAM) defined between Step 902 and Step 908 must be reset, Step 914 and the mode transition process aborted immediately.

Figure 11:
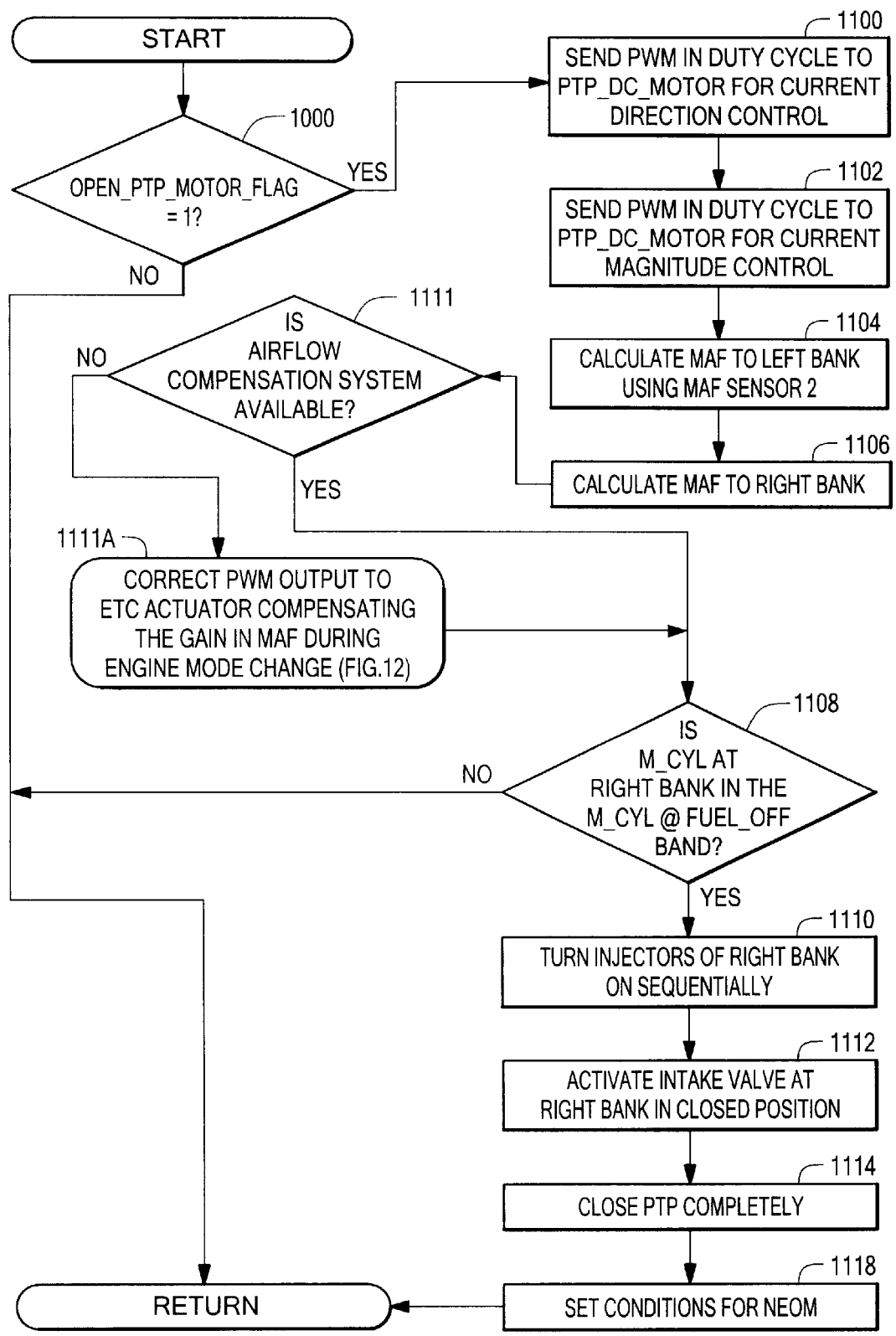

Referring now to FIG. 11, the flow diagram for the process used to perform the four to eight cylinder mode change is shown. In Step 1000, the PCM 40 checks to see if the OPEN_PTP_MOTOR_FLAG is set=1, i.e., whether there is active mode transition taking place. If not, the code execution process returns to the main program in FIG. 9. If there is an active transition, the PCM 40 sends a train of current pulses to the PTP motor 29 having a duty cycle (i.e., a pulse width modulated PWM train of pulses) having proper phase and magnitude, Steps 1100, 1102. Otherwise, where the duty cycle for the phase control is adjusted to rotates PTP in the opening direction and the duty cycle for the magnitude control (PTP angle control) is calibrated to make the total desired transition time as well as to achieve a desirable MAF at each PIP transition edge. It is noted, that if the PTP is powered by a rotary solenoid the above motor control logic in Step 1100 and Step 1102 is not applicable. In this case, the choice of the rotary solenoid is for a high torque constant rotational speed which has a closed to a constant transition period In Step 1104 the mass airflow to the left plenum 24 is calculated from the mass airflow sensor 39 disposed in the left plenum 24. The mass airflow to the right plenum 22 is calculated as $MAF_R=MAF_T-MAF_L$, in Step 1106. The method of calculating MAF using an airflow sensor has been described in the section under the topic "METHOD AND CONTROL STRATEGY". In an alternative embodiment, the mass airflow sensor 39 used in Step 106 can be spared by empirically calculating the ratio of the MAF through right bank to the MAF through left bank, which can be calibrated as a function of engine speed, TP and PTP. A more detail description of this topic has presented in the section under the topic "METHOD AND CONTROL STRATEGY". If a variable displacement engine has an electronic throttle control (ETC) system, the requirement for adjusting airflow to compensate the gain or loss of airflow during engine mode transitions may be accomplished with ETC system instead of using the airflow compensation system described below in connection with FIG. 13. Step 1111 is to find whether an airflow compensation system is available. In Step 1111A, a main throttle plate actuator (D.C. Motor) of an ETC system is powered by a continuous electric control pulse. Since the power input into motor is proportional to the pulse width, which generally refers to the duty cycle of a given pulse width. During the power transition, the duty cycle that was calculated from ETC PID controller are decreased by a proper amount, Δduty cycle, which causes that main throttle plate to close a little more, which results in a little less MAF (ΔMAF) being inducted into cylinders throughout the transition period. Consequently, it compensates for the gain in mass airflow during the engine mode change in accordance with a process to be described in more detail in connection with FIG. 12. The PCM 40 then, in Step 1108, determines whether the coordinate of engine speed and the mass of air charge inducting into a cylinder of the right intake manifold plenum is located at the M_CYL@FUEL_OFF band of FIG. 3, where M_CYL@FUEL_OFF band is bounded between $1.1*M\_CYL_{misfire\ limit}$, an upper boundary and $M\_CYL_{misfire\ limit}$, a lower boundary. The cylinder which is in its intake stroke and its MAF has just been measured and confirmed as within the M_CYL@FUEL_OFF band, should be easy to identify. Then, the cylinder that is next in firing order should be the first fuel injector to schedule for a fuel pulse width as a function of predicted M_CYL and desired air fuel ratio. However, if that cylinder is not at the right bank of the engine, cylinders $11_5-11_8$, then the cylinder that is next in firing order is the first cylinder to schedule for a first fuel pulse. Eventually, all injectors of the cylinders, cylinders $11_5-11_8$ connected to the right bank of the engine are fired sequentially (Step 1110) and activates the intake valves of such cylinders $11_5-11_8$ in a normal operating mode. Now, VDEOM to NEOM transition has been completed and conditions that associate with the VDEOM mode must be established: 4_CYLINDER_MODE=FALSE, 8_CYLINDER_MODE=TRUE and CLOSE_PTP_MOTOR_FLAG=OPEN_PTPMOTOR_FLAG=0, Step 1118. Now, the code execution process returns to the main program in FIG. 9.

Figure 12:
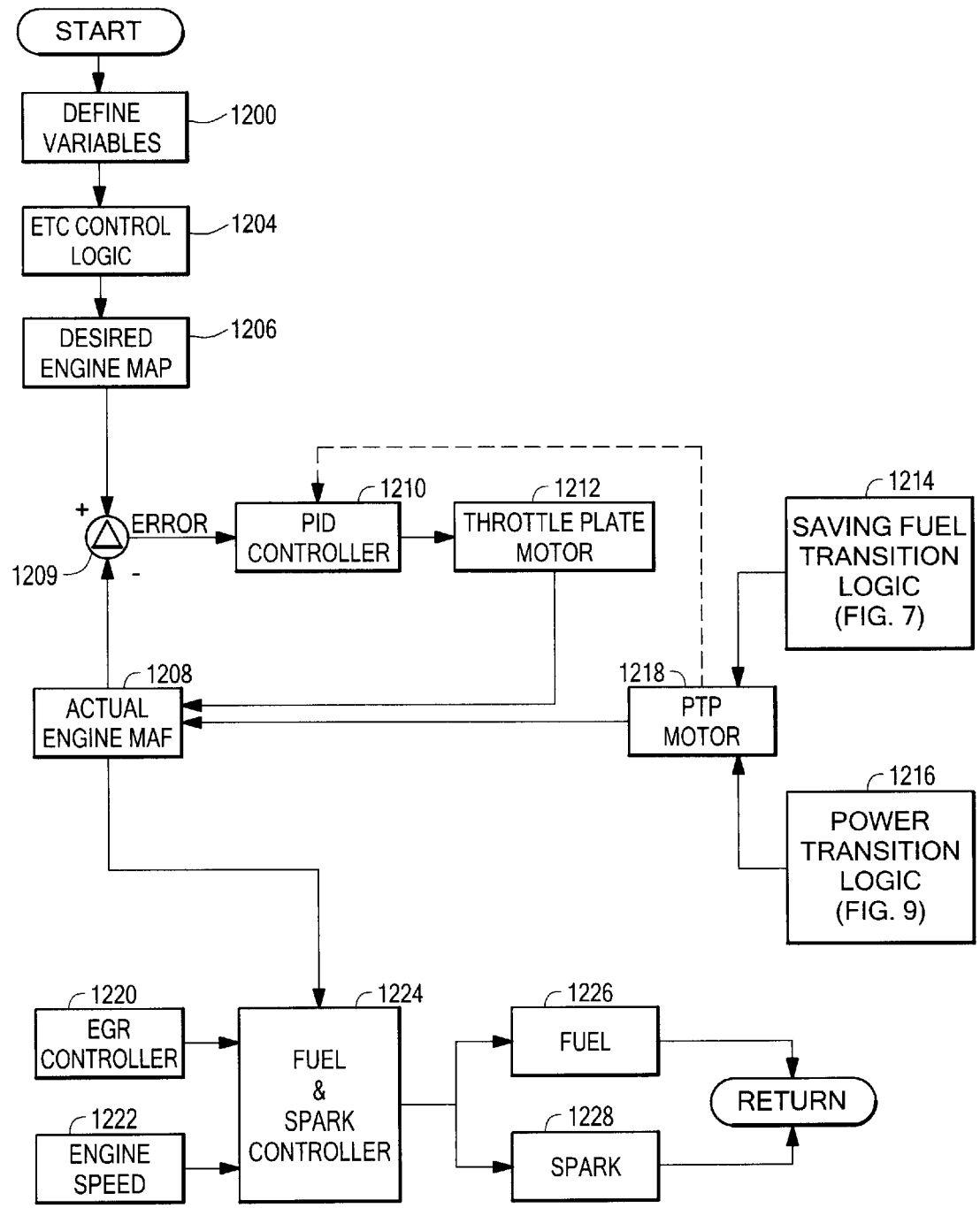
Figure 13:
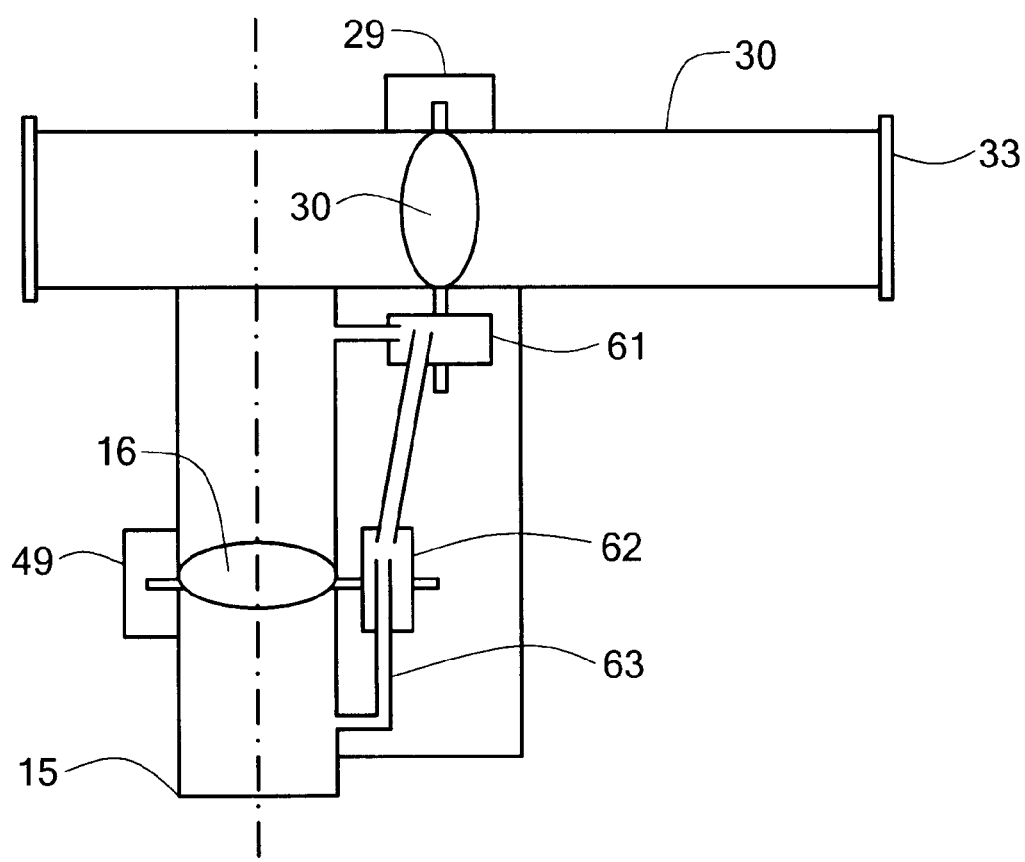
FIG. 13 is a diagram showing an airflow compensation system for use in the engine system of FIG. 1 according to an alternate embodiment of the invention.
Figure 13A:
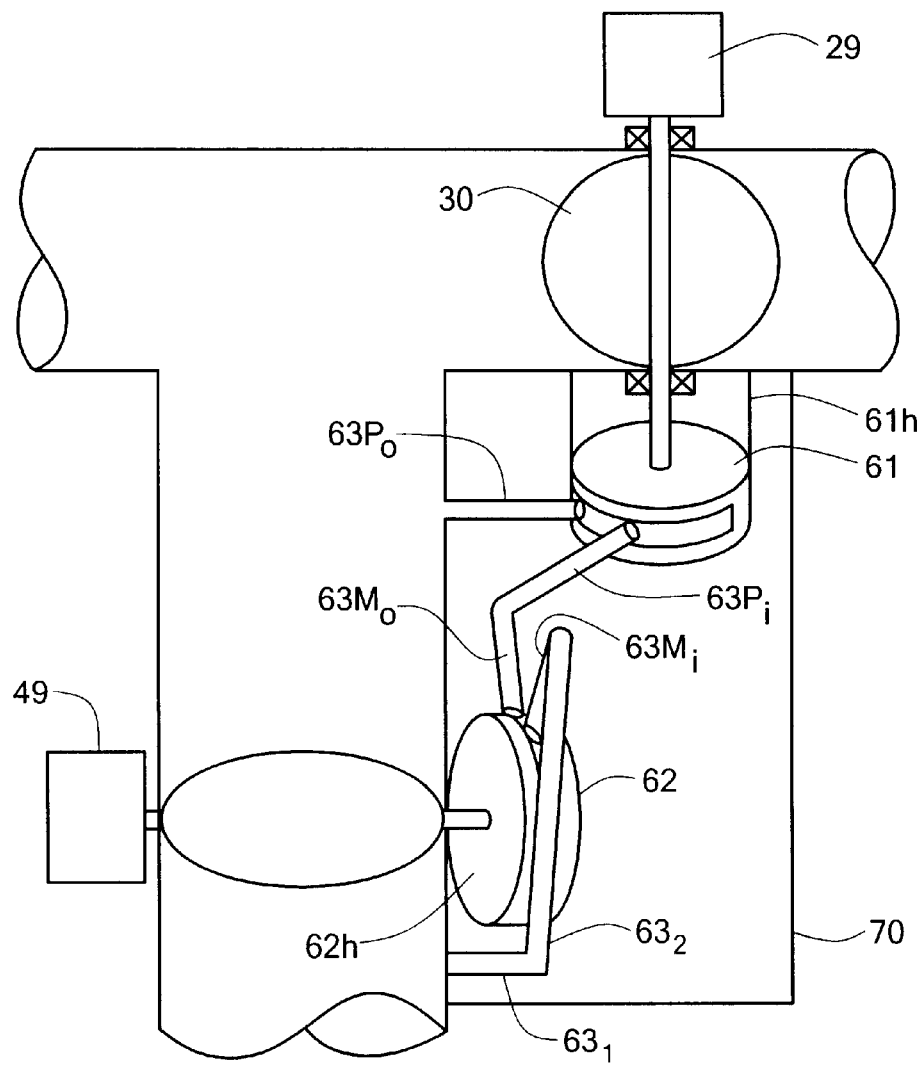
FIG. 13A is s sketch of a portion of the airflow compensation system of FIG. 13.

Referring now to FIG. 12, it depicts a simplified flow diagram of an electronic throttle control (ETC) system including the process of the intake airflow control system 14 of the present invention. The major input variables in Step 2000 are foot pedal (i.e., accelerator) position and vehicle speed. The foot pedal position is controlled by an operator and measured by a position sensor (not shown). The vehicle speed is calculated from the measured angular velocity of the output shaft. The major output variable is the desired engine MAF, Step 1206, which is a function of the engine torque requirement, which in turn is a function of foot pedal position, vehicle speed, engine speed, and output shaft torque, transmission gear, transmission toque converter efficiency and state, etc. The engine/vehicle torque control is a major task for ETC task, Step 1204. In Step 1208, the actual mass airflow determined from the main throttle body MAF sensor 52 is compared with the desired mass airflow and the difference between them is determined (Step 1209) to produce an error. It is the purpose of an ETC system to continuously drive the main throttle plate 16 to change the actual engine MAF so that the error between desired and actual MAF becomes a minimum. The position of the throttle plate is controlled by a D.C. motor, which is driven by a continuous electric rectangular pulse train having an amplitude of either zero or five volts with a constant pulse width (calibration input) but a variable duty cycle, which varies from 0% duty cycle (0% time has 5 volt means that the motor applies zero torque to the shaft of the throttle plate) to 100% duty cycle (100% time has 5 volts means that the motor applies the maximum torque to the shaft of the throttle plate). It is obvious that when the error is large it needs a large duty cycle to quickly drive error to a minimum and when the error is negative the duty cycle will be reduced. The duty cycle applying to the motor equals to the sum of proportional term, integral term and derivative term, (PID) where all these terms are respectively associated with the magnitude of latest error, summation of error continuously through time grid, and the rate of the error. The error will be controlled convergently if the magnitude and the relative weight of these terms are properly calibrated, Step 1210. If the desired engine MAF is greater than actual engine MAF, the error is positive and the PCM 40 commands TP motor to open TP wider, Step 1212, and it increases the actual engine MAF, which approaches to the engine desired MAF. In Step 1214, if the favorable condition for a saving fuel transition is detected, Step 1214 pointing to Step 702–Step 710 of FIG. 7, the PCM 40 commands the PTP motor to close PTP, Step 1218. The closing of PTP causes the actual engine MAF to decrease, Step 1208 and to increase the error, Step 1206 and Step 1208, and in turn the duty cycle to the TP motor, Step 1210, consequently will drive the TP motor to open TP more, i.e., to increase engine MAF, Step 1208. This is a desirable process to compensate the loss of MAF during the saving fuel transition. It has successfully changed the total engine MAF from FIG. 4A to FIG. 4B, which generates almost a constant engine MAF (engine torque output) through out the saving fuel transition. Similarly in Step 1214, if the favorable condition for a power transition is detected, Step 1216 pointing to Step 902 to 910 of FIG. 9, the PCM 40 commands the PTP motor to open PTP, Step 1218. The opening of PTP causes the actual engine MAF to increase, Step 1208 and to decrease the error, Step 1206 and Step 1208, and in turn the duty cycle to the TP motor, Step 1210, consequently will drive the TP motor to close TP more, i.e., to decrease engine MAF, Step 1208. This turns out to be a desirable process to compensate the gain of MAF during the power transition process. It has successfully changed the total engine MAF from FIGS. 5A to FIG. 5B, which generates almost a constant engine MAF (engine torque output) through out the power transition. Therefore, a VDE vehicle, which equipped with the ETC system described above, does have the ability to provide an airflow compensation process during the engine mode transition. However, if the transition system is designed for a very short transition period it may be necessary to provide an instant duty cycle correction (an open loop instant Δduty cycle, a calibration value as long as the PTP motor is activated) from Step 1218 to Step 1210 as shown in dotted line. Now, the two major engine control items, fuel injecting pulse width, Step 1226 and spark timing, Step 1228, are determined as a function of actual engine MAF (engine load), Step 1208, engine speed, Step 1222 and EGR, Step 1220.

Referring now to FIGS. 13, 13A–13F, an airflow compensation system is shown to properly compensate the loss or gain (i.e., $\Delta_{MAF}$) in total engine MAF during the mode transition as described above in connection with FIGS. 4A and 5A. Here, an air bypass passage network 63 is added to bypass the main throttle plate 16. The MAF passing through the air bypass passage network 63 is controlled by the combined position of two new spool valves, namely, plenum synchronized spool valve (PSSV) 61 and main synchronized spool valve (MSSV) 62. Further referring to FIG. 13A PSSV 61, a short cylinder in shape is built to the PTP 30 by sharing the same shaft as shown. Similarly, MSSV 62 is built to the MTP and shares the same shaft with the MTP 16. An exemplary one of the valves is sown in more detail in FIGS. 13B–13F.

Figure 13B:
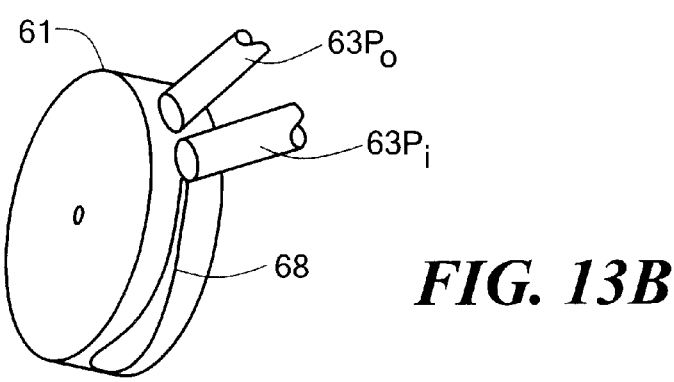
FIG. 13B is a three-dimensional sketch of an exemplary one of a pair of spool valves used in the system of FIGS. 13 and 13A, such valve being shown in a closed position in FIG. 13B.

As shown in FIG. 13B, both PSSV and MSSV are identical except each has its unique design of communication groove 68. The design factors for the communication groove that affect the MAF through these spool valves are the shape and depth the groove, the angle of the arc made by the both end of the groove and the location of the groove with respect to the center of the passage that engages with the groove. The base of the airflow compensation system 70 is a piece of rectangular block or slab on which the air bypass passage network 63 and housings for PSSV and MSSV (61h and 62h) are drilled. The air bypass passage network 63 consists of six straight holes: 63$_1$, 63$_2$, 63$m_i$ (input passage to MSSV), 63$m_o$ (output passage from MSSV), 63$p_i$ (input passage to PSSV) and 63$p_o$ (output passage from PSSV). The open ends of these drilled holes that open to the atmosphere must be sealed off. The base of the airflow compensation system 70 and spool valves 61, 62 should use same material to minimize the thermal expansion problem. The choice of the material should aim at the material which has low coefficient of thermal expansion, low coefficient of friction and high temperature and wear resistance, e.g., Teflon, polymer or even Lucite material. With proper designing the grooves of PSSV 61 and MSSV 62, the air bypass passage network 63 opens properly to allow additional amount of bypassed air to enter intake plenum(s) to increase the air mass during the engine fuel saving mode transition or closes properly to reduce the air mass during the engine power mode transition. It is noted that at the beginning of the saving fuel transition, the reduction in MAF is much smaller than near the end of the transition, therefore the width and depth of the communication groove at the beginning of the transition is narrower and shallower than those near the end of the transition. Furthermore, at the beginning of the saving fuel transition, none or only one of input and output passages (solid I/O passages at PTP=90 deg. in FIG. 13B) is communicating with the PSSV, while at the end of the transition, both passages must be in communicating with the PSSV (dotted I/O passages at PTP=0 deg. in FIG. 13B). It is noted that the total arc of the communication groove should embrace 90 degrees. If it is necessary, further adjustment of the other design factors may be performed and it is achievable that the engine MAF will be maintained to an approximately a constant level while hold MTP during the saving fuel transition as shown in FIG. 4B. Similarly, using the same procedure, the design of the communication groove of MSSV can be done to maintain approximately a constant engine MAF at different MTP. Since power transition is just a reverse process of the saving fuel process and will achieve the similar engine MAF as indicated in FIG. 5B.

Thus, referring to FIGS. 13C and 13D, it is noted that the valve 61 is in the open position since air, indicated by the dotted arrow, is able pass from passage 63P$_i$ to passage 63P$_o$ through groove 68. Referring to FIGS. 13E and 13F, it is noted that the valve 61 is in the closed position because the body of valve 61 prevents air from passing from passage 63P$_i$ to passage 63P$_o$ since groove 68 has moved away passage 63P$_i$ and passage 63P$_o$.

In order to providing smooth mode transition in a variable displacement internal combustion engine, an intake air flow control system has been invented to control the cylinder airflow at transition two embodiments of an airflow compensation system have been described, an electronic throttle control (ETC) system applying to the VDE mode transition and the cost saving mechanical control system described above in connection with FIG. 13, 13A–13F. With either embodiment, the intake air control system can achieve a near constant MAF through out the mode transitions (FIGS. 1A and 1B).

A number of embodiments of the invention have been described. Nevertheless, it will be understood that various modifications may be made without departing from the spirit and scope of the invention. Accordingly, other embodiments are within the scope of the following claims.

What is claimed is:
1. An internal combustion engine system, comprising:
  a plurality of cylinder banks, each one of the banks having at least one cylinder;
  a pair of plenums, each one of the banks being fed air through a corresponding one of the pair of manifold plenums;

a main throttle body having an outlet for feeding air to a pair of output ports, each one of such output ports being coupled to feed the air to a corresponding one of the pair of manifold plenums;

a main throttle plate disposed in the main throttle body for controlling airflow passing to the outlet of the main throttle body;

a plenum throttle plate disposed in one of the pair of plenums for controlling air from the one of the pair of output ports of the main throttle body coupled thereto to cylinders in the bank of cylinders coupled thereto; and a control system for, during transitions from an engine operation mode using a first number of the cylinders to a mode using a different number of the cylinders, operating the plenum throttle plate to provide a change in airflow to said one of the pair of plenums in a first sense thereby changing the airflow in the other one of the bank of cylinders in a second, opposite sense.

2. The system recited in claim 1 including an airflow compensation system for maintaining the airflow to the outlet of the main throttle body substantially constant during the mode change.

3. The system recited in claim 2 wherein the system includes a main throttle plate is an electronic throttle plate and wherein the airflow compensation system provides a compensation control signal to the electronic throttle plate.

4. The system recited in claim 2 wherein the airflow compensation system includes an airflow by-pass structure coupled to the main throttle body upstream of the main throttle to adjust airflow downstream of the main throttle as the number of operating cylinders in the mode changes.

* * * * *